(12) United States Patent
Murakami et al.

(10) Patent No.: US 6,853,237 B2
(45) Date of Patent: Feb. 8, 2005

(54) TEMPERATURE-COEFFICIENT-GENERATING CIRCUIT AND TEMPERATURE-COMPENSATING CIRCUIT USING THE SAME

(75) Inventors: Mitsumasa Murakami, Tokyo (JP); Masaya Hara, Tokyo (JP)

(73) Assignees: Mitsubishi Denki Kabushiki Kaisha, Tokyo (JP); Mitsubishi Electric Engineering Company, Tokyo (JP)

( * ) Notice: Subject to any disclaimer, the term of this patent is extended or adjusted under 35 U.S.C. 154(b) by 0 days.

(21) Appl. No.: 09/954,148

(22) Filed: Sep. 18, 2001

(65) Prior Publication Data

US 2003/0006822 A1 Jan. 9, 2003

(30) Foreign Application Priority Data

Mar. 27, 2001 (JP) .................................. 2001-090103

(51) Int. Cl.[7] .............................................. H01L 35/00
(52) U.S. Cl. ..................... 327/512; 327/513; 330/289
(58) Field of Search ............................... 327/512, 513, 327/83, 307, 345, 346, 561; 330/256, 289

(56) References Cited

U.S. PATENT DOCUMENTS

| | | | | |
|---|---|---|---|---|
| 4,873,490 A | * | 10/1989 | Hecht et al. | 327/513 |
| 5,134,885 A | * | 8/1992 | Hecht et al. | 330/256 |
| 5,796,291 A | * | 8/1998 | Mattes et al. | 327/513 |
| 6,181,192 B1 | * | 1/2001 | Tohyama et al. | 327/513 |

FOREIGN PATENT DOCUMENTS

| | | |
|---|---|---|
| JP | 62-118620 | 5/1987 |
| JP | 63-269812 | 11/1988 |

* cited by examiner

*Primary Examiner*—Long Nguyen

(57) ABSTRACT

The invention provides a temperature-compensating circuit which comprises first degree and second degree temperature-coefficient-generating circuits respectively comprising an operational amplifier and a plurality of resistors each having different temperature coefficient, a sign-inverting circuit, and first degree and second degree temperature-coefficient-adjusting circuits. Resistance values of the resistors of the first degree and second degree temperature-coefficient-generating circuits are decided so that voltage amplification factors are linearly or quadratically changed as a temperature changes. The sign-inverting circuit inverts signs of temperature coefficients generated by the first degree and second degree temperature-coefficient-generating circuits and the first degree and second degree temperature-coefficient-adjusting circuits adjust temperature coefficients generated by the first degree and second degree temperature-coefficient-generating circuits to predetermined values. The temperature-compensating circuit generates any temperature coefficients necessary for temperature compensation to cancel an offset drift constant in the temperature characteristic of a sensor output and fluctuation components due to span-shift first degree and second degree temperature coefficients.

9 Claims, 16 Drawing Sheets

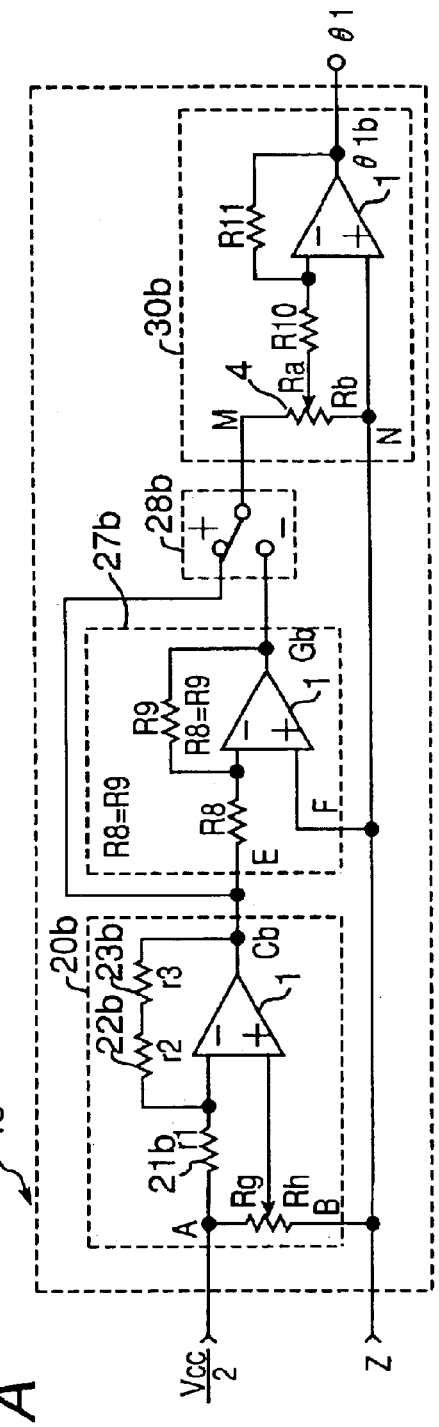
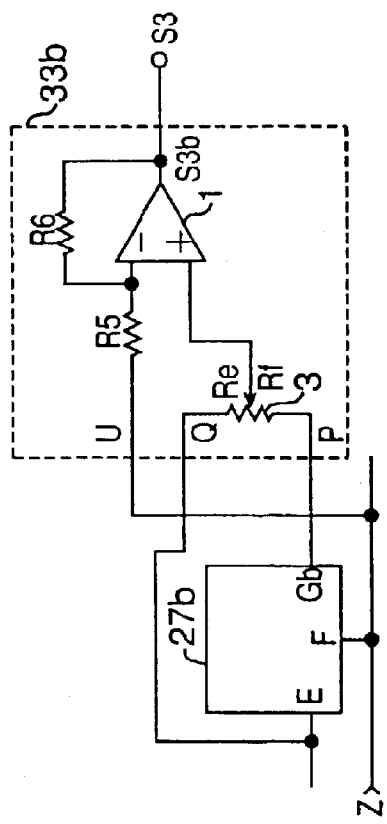
Fig.3A
Fig.3B

Fig.14D1
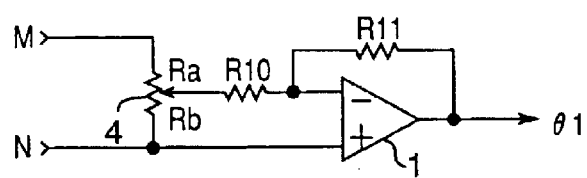
Fig.14D2
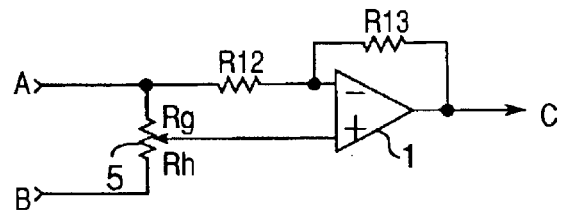
Fig.14E
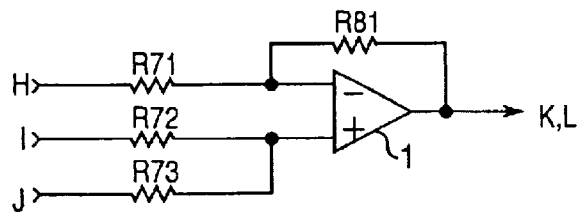
Fig.14G
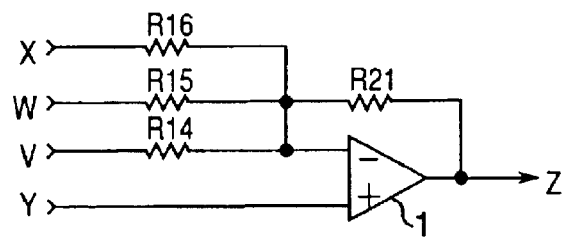

Fig.15H1
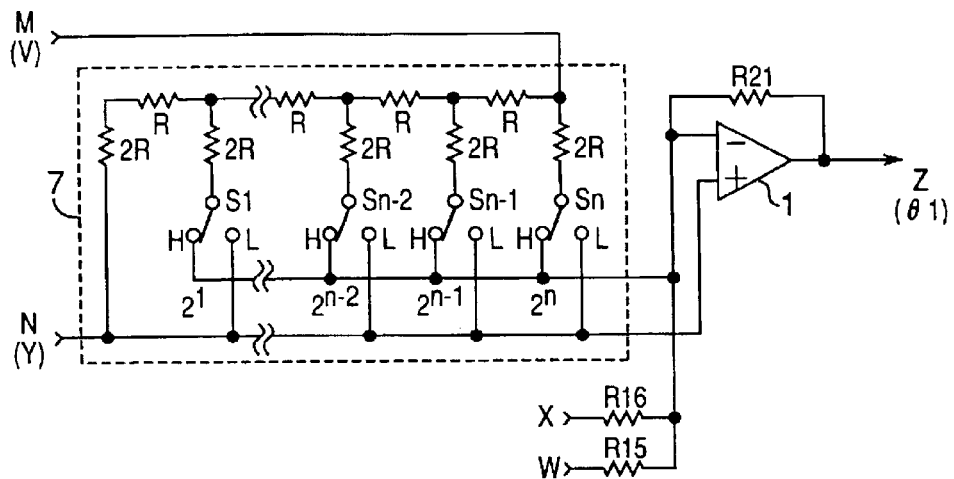
Fig.15H2
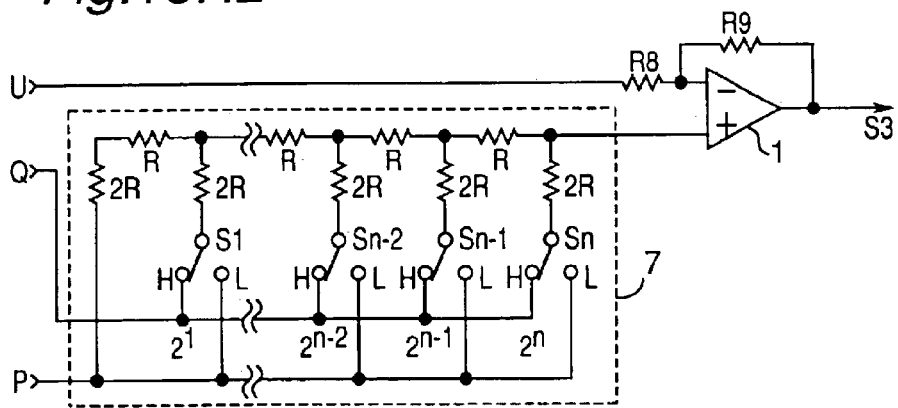

TEMPERATURE-COEFFICIENT-GENERATING CIRCUIT AND TEMPERATURE-COMPENSATING CIRCUIT USING THE SAME

BACKGROUND OF THE INVENTION

1. Field of the Invention

The present invention relates to a temperature-compensating circuit, particularly to a temperature-compensating circuit for compensating a detected-voltage error of a pressure sensor or the like caused by an ambient-temperature change.

2. Description of the Related Art

In the case of pressure detection using a pressure sensor, a detected voltage obtained from the pressure sensor is influenced by the ambient temperature of a place on which the sensor is disposed, and therefore an accurate detected voltage may not be obtained due to a temperature change. For example, under an environment in which an ambient temperature ta changes between −40° C. and 125° C., the detected voltage u (V) supplied from the pressure sensor is shown by the following expression.

$$u = aP\{1 + \alpha(ta-ts)\} + \beta(ta-ts) + b \quad (1),$$

where "a" is a constant, "P" is a pressure (or atmospheric pressure) detected by the pressure sensor, "α" is a span-shift temperature coefficient, "ta" is an ambient temperature (° C.) of the pressure sensor, "ts" is a reference temperature (° C.), "β" is an offset drift constant (mV/° C.), and "b" is an offset voltage (V).

For example, when assuming the span-shift temperature coefficient α as 3,000 ppm/° C. and the offset drift constant β as 1.5 mV/° C., ts is equal to 25° C., α(ta−ts) is equal to 0.3 when ta is equal to 125° C. and errors occur which are +30% more than those obtained for an ambient temperature ta=25° C. Moreover, in this case, β(ta−ts) is equal to 0.15 V and errors occur which are +0.15 V higher than those for an ambient temperature ta=25° C. It is preferable that errors caused by these temperature changes are minimized. Therefore, various temperature-compensating methods are practically used in order to keep errors caused by α(ta−ts) or β(ta−ts) within ±(2−3%) of aP under an operating environment of −40° C.≦ta≦125° C. and obtain an output voltage proportional to u≈aP.

To cancel errors due to the above α and β via an electrical circuit, a semiconductor integrated circuit has been used so far and as downsizing of a semiconductor device is accelerated, the request for downsizing a semiconductor device can be comparatively easily achieved. FIG. 16 shows an example of the above type of circuit.

FIG. 16 is a block diagram of a temperature-compensating semiconductor integrated circuit. A semiconductor integrated circuit 200 performs temperature-compensation of an output supplied from a pressure sensor 202 for detecting a pressure P to convert the pressure P to a voltage. The semiconductor integrated circuit 200 is provided with a temperature sensor 204 and the temperature sensor 204 is set nearby the pressure sensor 202 to measure an ambient temperature ta of the pressure sensor 202. The semiconductor integrated circuit 200 is provided with DC-voltage amplifiers 206 and 208 for amplifying signal voltages supplied from the pressure sensor 202 and temperature sensor 204 up to predetermined voltages. Signal lines 210 and 211 connect detected voltages supplied from the pressure sensor 202 and temperature sensor 204 to input terminals of the DC-voltage amplifiers 206 and 208. The signal line 210 supplies the pressure detection voltage u shown by the expression (1) and the signal line 211 supplies a voltage (or current) corresponding to the ambient temperature ta of the temperature sensor 204.

Moreover, the semiconductor integrated circuit 200 has A/D converters 213 and 214. The A/D converters 213 and 214 convert analog voltages obtained from output ends of the DC-voltage amplifiers 206 and 208 to digital values. A control-signal-generating circuit 216 supplies various types of control signals to blocks and controls circuit blocks in the semiconductor integrated circuit 200. A temperature-compensating operational circuit 218 is controlled by the control-signal-generating circuit 216 to digitally process $aP\{1+\alpha(ta-ts)\}$, $\beta(ta-ts)$ and b by using digital values sent from the A/D converters 213 and 214 and values α, β, and b of temperature coefficients which are input as constants and add them each other. A D/A converter 220 receives a computation result from the temperature-compensating operational circuit 218 to convert the result to an analog voltage corresponding to the computation result. A temperature-compensated pressure-detection voltage v obtained from the following expression appears from an output terminal 222.

$$v = aP \text{ or } v = aP + C \quad (2),$$

where C is a constant voltage.

Since a conventional circuit is constituted as described above, a method using the circuit is a high-accuracy, less-error, and secure method as a method for temperature compensation of a sensor-output-signal voltage u.

However, the above method has disadvantages that the circuit configuration is complex and the chip size of a semiconductor integrated circuit becomes comparatively large. When it is desired to reduce the price of the semiconductor integrated circuit 200 and a sensor-output-voltage accuracy due to a temperature change is allowed within a range of 2.0 to 2.5%, it is necessary to design the circuit which is capable of meeting the request for the price by simplifying functions of a temperature-compensating circuit and reducing the number of circuit devices.

SUMMARY OF THE INVENTION

The present invention is made to solve the above problems and its object is to provide a temperature-compensating circuit for implementing temperature compensation of an output of a pressure sensor by a simple configuration and a temperature-coefficient-generating circuit for generating a temperature coefficient necessary for the temperature compensation.

In a first aspect of the invention, a first degree temperature-coefficient-generating circuit is provided. The circuit comprises an amplifying circuit which includes a combination of an operational amplifier and a plurality of types of resistors, each resistor having different temperature coefficients. Resistance value of each resistor is decided so that voltage amplification factor of the amplifying circuit is linearly changed with a first degree temperature coefficient as a temperature changes. The plurality of types of resistors may include two or three types of resistors.

In a second aspect of the invention, a second degree temperature-coefficient-generating circuit comprises an amplifying circuit which includes a combination of an operational amplifier and a plurality of types of resistors, each resistor having different temperature coefficients. Resistance value of each resistor is decided so that voltage amplification factor of the amplifying circuit is quadratically changed with a second degree temperature coefficient as a temperature changes. The plurality of types of resistors may include two or three types of resistors.

In a third aspect of the invention, an offset-drift-constant temperature-compensating circuit is provided. The circuit comprises the above first degree temperature-coefficient-generating circuit, a sign-inverting circuit for receiving a signal voltage from the first degree temperature-coefficient-generating circuit and generating a voltage obtained by inverting the sign of the first degree temperature coefficient in the received signal voltage, a sign-switching circuit for selecting an output supplied from either of the first degree temperature-coefficient-generating circuit and the sign-inverting circuit, and a first degree temperature-coefficient-adjusting circuit for receiving a signal voltage from the sign-switching circuit and generating a voltage obtained by adjusting a first degree temperature-coefficient component to a predetermined value in the received signal voltage. A voltage obtained by dividing a power-supply voltage is applied as an input voltage of the first degree temperature-coefficient-generating circuit. An output voltage to be linearly changed in accordance with an ambient-temperature change is generated at an output end of the first degree temperature-coefficient-adjusting circuit.

In a fourth aspect of the invention, a span-shift temperature-coefficient first degree compensating circuit is provided. The circuit comprises the above first degree temperature-coefficient-generating circuit in which the voltage amplification factor is set to either of 1 and 2 at a reference temperature, a sign-inverting circuit, a sign-switching circuit, a first degree temperature-coefficient-adjusting circuit. The sign-inverting circuit receives a signal voltage from the first degree temperature-coefficient-generating circuit and generating a voltage obtained by inverting the sign of the first degree temperature coefficient in the received signal voltage. The sign-switching circuit selects an output supplied from either of the first degree temperature-coefficient-generating circuit and the sign-inverting circuit. The first degree temperature-coefficient-adjusting circuit receives a signal voltage from the sign-switching circuit and outputting a voltage obtained by adjusting the first degree temperature coefficient to a pre-determined value in the received signal voltage. A voltage including a first degree temperature coefficient component is used as an input signal of an operational amplifier of a first degree temperature-coefficient-generating circuit. A signal voltage is generated at an output end of the first degree temperature-coefficient-adjusting circuit, which cancels the first degree temperature coefficient component of the input signal and includes a second degree temperature coefficient component.

In a fifth aspect of the invention, a span-shift temperature-coefficient second degree compensating circuit is provided. The compensating circuit comprises the above second degree temperature-coefficient-generating circuit in which the voltage amplification factor is set to 1 at a reference temperature, and a second degree temperature-coefficient-adjusting circuit for receiving a signal voltage from the second degree temperature-coefficient-generating circuit and outputting a voltage obtained by adjusting the second degree temperature coefficient to a predetermined value in the received signal voltage. The operational amplifier of the second degree temperature-coefficient-generating circuit receives a signal voltage including a second degree temperature coefficient component from the above span-shift temperature-coefficient first degree compensating circuit. An output voltage is generated in which a second degree temperature coefficient component in a fluctuation component of the output signal to a temperature change is canceled and a quaternary temperature coefficient component at an output end of the second degree temperature-coefficient-adjusting circuit is included.

<Advantages>

According to a temperature-coefficient-generating circuit of the present invention, it is possible to accurately generate an amplification factor including a first or second degree temperature-coefficient term necessary for temperature compensation by a simple analog circuit configuration including two or three types of resistors each having different temperature coefficient and an operational amplifier. Thereby, it is possible to eliminate a voltage component due to a first degree temperature coefficient out of temperature fluctuation components of a signal voltage in a rear-stage circuit. Moreover, since this circuit uses different types of resistors, it can be applied to a semiconductor analog integrated circuit such as a CMOS or bipolar circuit.

An offset-drift-constant temperature-compensating circuit of the present invention makes it possible to compensate an error component generated by the offset-drift-constant term of a pressure sensor by a simple analog circuit configuration. By using the circuit, it is possible to realize a compact low cost temperature-compensating circuit.

A span-shift-temperature-coefficient compensating circuit of the present invention makes it possible to eliminate an error component due to a first or second degree temperature-coefficient term out of fluctuation components to a temperature change of an input signal and compensate temperature by a simple analog circuit configuration including a plurality of resistors each having different temperature coefficient and an operational amplifier. By using the circuit, it is possible to realize a compact low-cost temperature-compensating circuit.

BRIEF DESCRIPTION OF THE DRAWINGS

FIGS. 3A and 3B are circuit diagrams of a span-shift-temperature-coefficient first degree compensating circuit in the first embodiment of the present invention.

FIGS. 14D1, 14D2, 14E, and 14G are illustrations (group 2) for explaining basic circuit blocks constituting a temperature-compensating circuit of the present invention.

FIGS. 15H1 and 15H2 are illustrations (group 3) for explaining basic circuit blocks constituting a temperature-compensating circuit of the present invention.

DETAILED DESCRIPTION OF THE PREFERRED EMBODIMENTS

Figure 1:
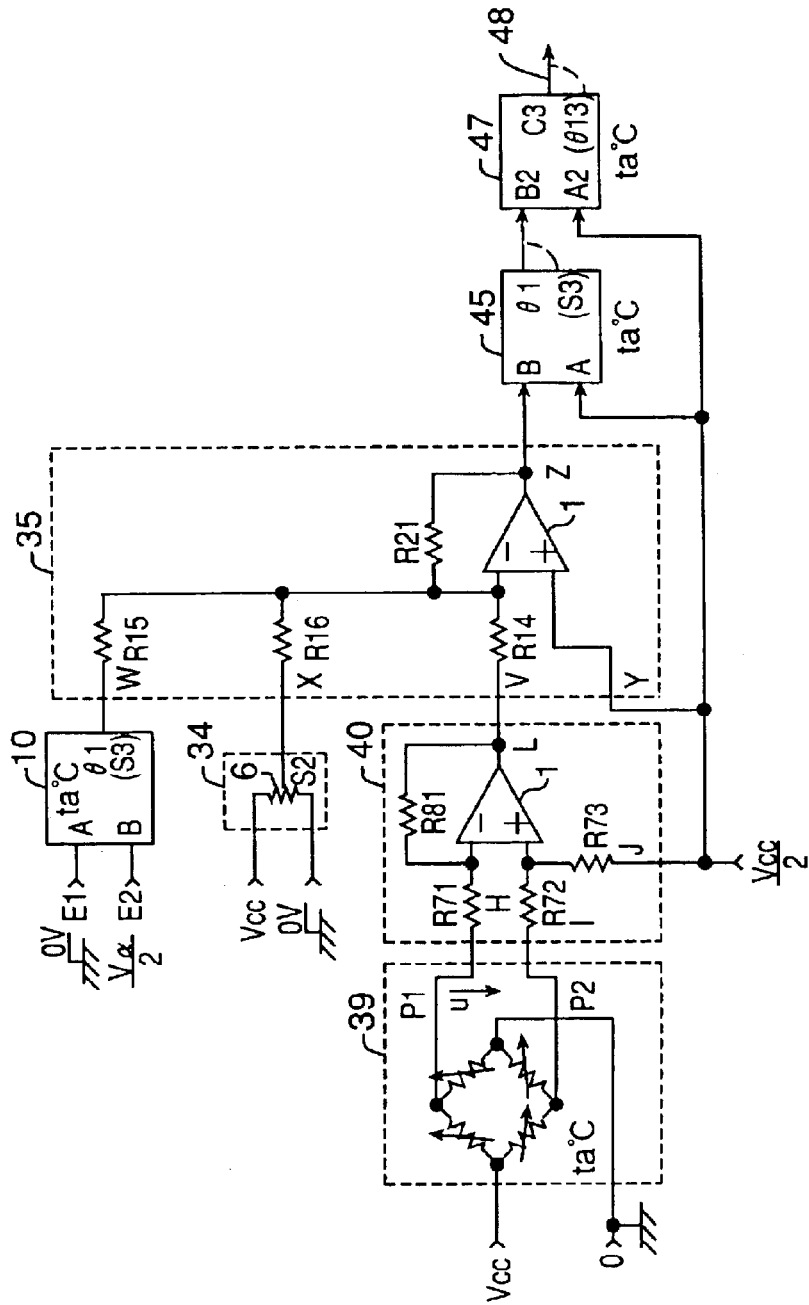
FIG. 1 is a whole circuit diagram of a temperature-compensating circuit in the first embodiment of the present invention.

A temperature compensation circuit of the preferred embodiments according to the invention will be described below with reference to accompanying drawings.
(Outline of the Invention)

In the case of the present invention, temperature compensation according to digital processing using the A/D converter, D/A converter, temperature-compensating operational circuit, and control circuit is not performed like the case of the above-described conventional example but temperature compensation is performed in accordance with analog-signal-voltage processing. Therefore, a circuit configuration is used which obtains the temperature-compensated signal voltage shown in the expression (2) from the output terminal of an analog-signal-voltage-processing-type temperature-compensating circuit by amplifying the sensor output voltage shown in the expression (1) and shifting the level of the signal voltage and thereby applying the voltages to the input terminal of the temperature-compensating circuit. Thus, it is possible to provide an integrated circuit in which an electronic circuit is simplified and the chip size is smaller than an electronic circuit for performing digital-mode processing.

The outline of the configuration of the temperature-compensating circuit is described below.

Firstly, the pressure detection voltage u shown in the expression (1) supplied from a sensor is amplified to a voltage level necessary for an analog-signal-voltage-amplifying circuit to obtain the voltage V shown by the following expression.

$$V = AP\{1+\alpha(ta-ts)\} + c\beta(ta-ts) + B \quad (3)$$

where A, c and B are constants.

On a semiconductor integrated circuit disposed in the same circumstances as a pressure sensor, a value $-c\beta(ta-ts)$ is generated by using an offset-drift-constant-compensating circuit, and a voltage $-B$ is generated by dividing a power-supply voltage through resistors. The offset-drift-constant-compensating circuit has a plurality of resistors which are used as a temperature sensor. The plurality of sensors have different first degree (linear) and second degree (quadratic) temperature coefficients, and are under the same temperature circumstance as the pressure sensor. Then, the voltage V obtained from the pressure sensor shown in the expression (3), a voltage value $-c\beta(ta-ts)$, and $-B$ are canceled by applying them to an adding circuit and adding them to obtain a voltage v from the output terminal of the adding circuit.

$$v \approx AP\{1+\alpha(ta-ts)\} \quad (3b)$$

Here, the above expression is shown by using symbol ≈ because the offset drift constant β is slightly changed due to the temperature ta−ts in a circuit of the present invention and thereby, an error occurs in numerical calculation. However, the error does not affect the entire circuit error. Moreover, the expression (3b) shows that there is an error corresponding to $\alpha(ta-ts)$ for the voltage AP.

Secondly, the voltage v shown by the expression (3b) is taken as an input signal. On the same chip of the semiconductor integrated circuit, a span-shift-temperature-coefficient first degree compensating circuit is constituted which has a plurality of resistors having first degree and second degree temperature coefficients which are different from each other as a temperature sensor. Constituted is a first degree temperature-compensating operational circuit in which $Vo=Vi\{1-\alpha(ta-ts)\}$ is effectuated as a transfer function between terminals of the input Vi and output Vo of the circuit. The signal v shown by the expression (3b) is applied to the input Vi to realize Vi=v. Then, an output voltage Vo is obtained from the output terminal of an operational circuit.

$$Vo \approx AP\{1+\alpha(ta-ts)\}\{1-\alpha(ta-ts)\} \quad (4)$$

$$\approx AP\{1-\alpha^2(ta-ts)^2\}$$

In the above expression, at span-shift temperature coefficient α=3,000 ppm/° C., ts=25° C., and ta=125° C., when $\alpha(ta-ts)=0.3$, an error is equal to $-0.09$. Thus, the pressure detection voltage including an error of +30% is improved in accuracy, and the pressure detection voltage Vo which has the error reduced to −9% for AP is obtained The expression (4) shows that AP includes an error corresponding to $-\alpha^2(ta-ts)^2$.

Moreover, at the third stage, Vo shown by the expression (4) is used as an input signal. A span-shift-temperature-coefficient second degree compensating circuit is comprised of a plurality of resistors that are formed on the same chip of the semiconductor integrated circuit and have different first degree and second degree temperature coefficients, and a plurality of operational circuits with cascade connection. The span-shift-temperature-coefficient second degree compensating circuit has the transfer function input terminal Vii and output terminal Voo which is $Voo \approx Vii\{1+\alpha^2(ta-ts)^2\}$. Applying the signal Vo shown by the expression (4) to the input terminal Vii, an output Voo of an operational circuit is obtained from the output terminal of a span-shift-temperature-coefficient second degree compensating circuit by the following manner.

$$Voo \approx AP\{1-\alpha^2(ta-ts)^2\}\{1+\alpha^2(ta-ts)^2\} \quad (5)$$

$$\approx AP\{1-\alpha^4(ta-ts)^4\}$$

The expression (5) shows that AP includes an error corresponding to $-\alpha^4(ta-ts)^4$.

When $\alpha(ta-ts)$ is equal to 0.3 in the above case of α=3,000 ppm/° C., ts=25° C., ta=125° C., $-\alpha^4(ta-ts)^4$ is almost equal to 0.0081, that is, the expression (5) shows that an error of −0.81% is included. In the above expression (5) the notation of "≈" is used because of the following reason. In a circuit of the present invention, α adjusted by a temperature-compensating circuit is changed by several % due to ta−ts, and thus an error which cannot be deleted is generated in calculation. The error that can be realized becomes about −1.2% as a calculated value. However, this degree of error can be used as a sensor output voltage excluding the influence of an error generated due to an ambient temperature.

As described above, the present invention reduces the influence of a temperature change and obtains an output signal of Voo≈AP by using a resistor formed on a semiconductor integrated circuit as a temperature sensor, converting a temperature change to a resistance-value change, linearly changing voltage amplification factors of an operational circuit, and thereby compensating the temperature of a pressure-sensor output voltage. The linear change denotes a change of the temperature coefficient of a voltage amplification factor within ±5% in an operating-temperature range.

(Elemental Circuit Constituting Temperature-Compensating Circuit)

A temperature-compensating circuit of the present invention is constituted by cascading a plurality of analog-operational-amplifier-circuit blocks formed on a semiconductor-integrated-circuit chip. Transfer functions showing output signals to input signals of operational-amplifier-circuit blocks and their setting conditions are different from each other. Therefore, first, the circuit configuration and transfer function of each block constituting a temperature-compensating circuit of the present invention are described below by referring to FIGS. 13 to 15.

Figure 13A:
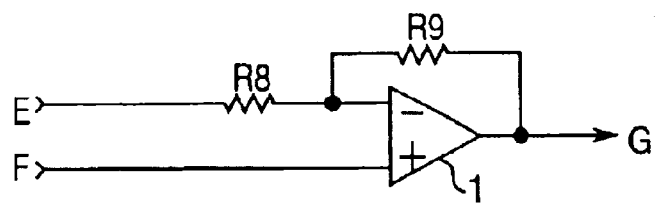
FIGS. 13A to 13C are illustrations (group 1) for explaining basic circuit blocks constituting a temperature-compensating circuit of the present invention.

FIGS. 13 to 15 are illustrations showing general circuits constituted by using operational amplifiers. In the circuit diagram shown in FIG. 13A, an operational amplifier 1 is a stable DC operational amplifier having a high voltage amplification factor of 80 to 140 dB. The operational amplifier 1 connects with an output terminal G, an input terminal E to which a signal voltage is applied from an external unit, and input terminals E and F. The transfer function between the input and output terminals in FIG. 13A is shown by the following expressions (10) and (11).

$$G = F + (R9/R8)(F-E) \tag{10}$$

$$G = E + (1 + R9/R8)(F-E) \tag{11}$$

Signal voltages applied to the input terminals E and F provide operation results by the expressions (10) and (11) at the output terminal G. A voltage amplification factor of the operational amplifier 1 is R9/R8 or 1+R9/R8 and has a voltage amplification effect on a differential voltage (F−E). In general, resistors having the same temperature coefficient are used for R9 and R8 to cancel the fluctuation of voltage amplification factors due to temperature. However, because the present invention uses R8 and R9 as temperature sensor devices, they are used as circuits for detecting temperatures by combining two or three types of a plurality of resistors having first degree and second degree temperature coefficients different from each other and thereby, changing temperature coefficients, and linearly changing voltage amplification factors.

When R8 is equal to R9, the operational circuit shown in FIG. 13A serves as an inverter circuit for inverting the sign of the input signal E. The transfer function for input/output is shown by the following expressions.

$$G = F + (F-E) \tag{12}$$

$$G = E + 2(F-E) \tag{13}$$

Figure 13B:
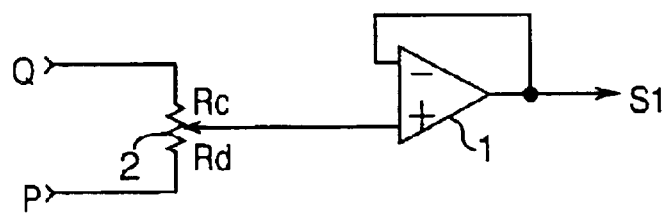

The transfer function S1 of the circuit shown in FIG. 13B is shown by the following expressions.

$$S1 = D2(Q-P) + P \tag{14}$$

$$D2 = Rd/(Rc+Rd) \tag{15}$$

where Rc is a resistance value between a terminal Q and a slider of a variable resistor 2, and Rd is a resistance value between a terminal P and the slider. A value D2 (0≦D2≦1) is adjusted by changing a position of the slider.

Figure 13C:
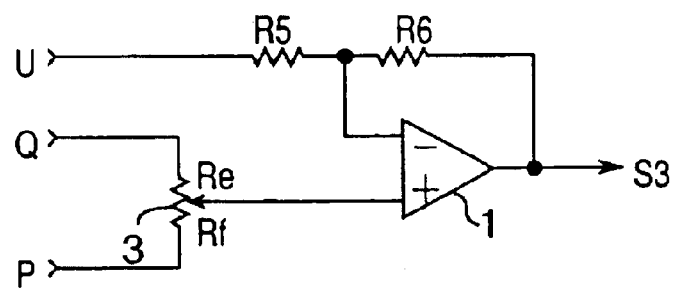
Figure 16:
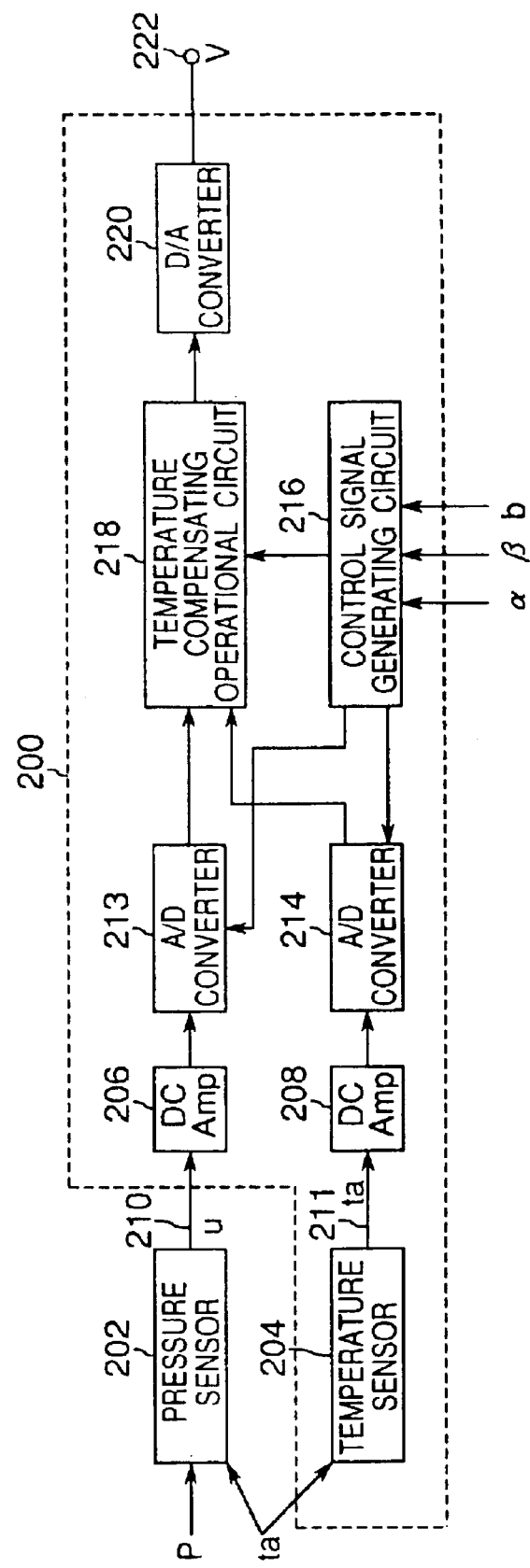
FIG. 16 is a block diagram of a conventional temperature-compensating circuit.

The input/output transfer function S3 of the circuit shown in FIG. 13C is shown by the following expressions.

$$S3 = U + (1 + R6/R5)(S1-U) \tag{20}$$

$$S1 = D3(Q-P) + P \tag{21}$$

$$D3 = Rf/(Rf+Re) \tag{22}$$

In the above expressions, Re denotes the resistance value between the terminal Q and the slider of a variable resistor 3, and Rf denotes the resistance value between the terminal P and the slider. A value D3 (0≦D3≦1) is adjusted by changing a position of the slider. The circuit is obtained by adding the variable resistor 3 to the circuit diagram shown in FIG. 13A.

The input/output transfer function θ1 of the circuit shown in FIG. 14D1 is shown by the following expressions.

$$\theta1 = N + (D1 \cdot R/R10)(N-M) \tag{25}$$

$$D1 = Rb/\{Rb + Ra(1 + Rb/R10)\} \tag{26}$$

where Ra is a resistance value between a terminal A and a slider of a variable resistor 4, and Rb is a resistance value between a terminal N and the slider of the variable resistor 4. The value D1 (0≦D1≦1) is adjusted by changing a position of the slider of the variable resistor 4. D1(R11/R10) is a voltage amplification factor to a differential voltage (N−M) which can be adjusted by D1.

The input/output transfer function C of the circuit shown in FIG. 14D2 is shown by the following expressions.

$$C = A + D4(1 + R13/R12)(B-A) \tag{27}$$

$$D4 = Rg/(Rg+Rh) \tag{28}$$

where Rg is a resistance value between the terminal A and a slider of a variable resistor 5, and Rh is a resistance value between a terminal B and the slider of the variable resistor 5. A value D4 (0≦D4≦1) is adjusted by changing a position of the slider of the variable resistor 5.

The circuit diagrams shown in FIGS. 14B, 14C, 14D1, and 14D2 use variable resistors 2, 3, 4, and 5. To realize devices corresponding to these variable resistors by an integrated circuit, functions corresponding to the variable resistors are realized in general by using an R-2R resistor array and analog switches and changing the analog switches in accordance with a signal supplied from a logic circuit. The circuit diagrams in FIGS. 15H1 and 15H2 show examples of the functions. These circuits are generally used as D/A converters with an input terminal to be applied with a constant voltage for converting digital values to analog voltages. In this case, however, they are used as variable resistors by applying signal voltages instead of a constant voltage. Resistors R and 2R are constituted by resistors having high-accuracy resistances and the same temperature coefficients. S1 . . . Sn−2, Sn−1, and Sn denote analog switches of n circuits. By changing an analog switch to H or L side, voltages between the terminals Q and P (or M and N) are changed and a corresponding output voltage is obtained from the output terminal S3 or Z via the operational amplifier 1. When a variable resistor must be provided on an integrated circuit, the circuit shown in either of these circuit diagrams is used to obtain the function of a variable resistor. However, voltages to be changed are not continuously changed but they are stepwise changed. Therefore, the resolution of a variable resistor can be improved by increasing the value of n corresponding to the number of bits of a logic circuit.

In the case of the circuit shown in FIG. 15H1, the internal resistance value viewed from the portion between the terminals M and N has a constant value R independently of the switching position of analog switches. Moreover, in the case of the circuit shown in FIG. 15H2, the internal resistance value viewed from the terminals Q and P depends on the switching position analog switches.

Input/output transfer functions of the circuits shown in FIGS. 15H2 and 15H1 are shown by the following expressions.

$$S3=U+(1+R9/R8)(S2-U) \quad (32)$$

$$S2=D3(Q-P)+P$$

$$D3=0, 1/(2^n), 2/(2^n), \ldots, (2^n-2)/(2^n), (2^n-1)/(2^n).$$

$$Z=N+J(R21/R)(N-M)+(R21/R15)(N-W)+(R21/R16)(N-X) \quad (34)$$

$$J=0, 1/(2^n), 2/(2^n), \ldots, (2^n-2)/(2^n), (2^n-1)/(2^n).$$

By using resistors having the same temperature coefficients as the above resistors, it is possible to suppress the fluctuation of output voltages or voltage amplification factors due to a temperature change of resistance values.

The following input/output transfer function K or L is obtained from the circuit shown in FIG. 14E.

$$K=J+I-H \quad (36)$$

where R71=R72=R73=R81,
or $$L=J+(R81/R71)(I-H) \quad (37)$$

where R71=R72, R73=R81.

The input/output transfer function of the circuit diagram shown in FIG. 14G is obtained by the following expression.

$$Z=Y+(R21/R14)(Y-V)+(R21/R15)(Y-W)+(R21/R16)(Y-X) \quad (38)$$

In general, since resistors having the same temperature coefficients are used for resistors R14, R15, R16, and R21, the fluctuation of amplification factors due to temperature is suppressed to reduce fluctuations of drifts and voltage-amplification factors. This circuit is generally used as an adding circuit for obtaining an added value of analog signals (Y−V), (Y−W), and (Y−X).

A temperature-compensating circuit of the present invention described below is realized by cascading a first degree temperature-coefficient-generating circuit, a span-shift second degree temperature-coefficient-generating circuit, and some circuit blocks shown in FIGS. 13 to 15. Specifically, the temperature-compensating circuit comprises a proper combination of a first degree temperature-coefficient-generating circuit for accurately generating a voltage amplification factor having a first degree temperature-coefficient term necessary for temperature compensation, an offset-drift-constant-compensating circuit constituted by using the first degree temperature-coefficient-generating circuit, a span-shift-temperature-coefficient first degree compensating circuit, a span-shift second degree temperature-coefficient-generating circuit for generating a voltage amplification factor having a second degree temperature-coefficient term, and a span-shift-temperature-coefficient second degree compensating circuit constituted by using a span-shift second degree temperature-coefficient-generating circuit.

First Embodiment.

<1. General Configuration of Temperature-compensating Circuit>

FIG. 1 shows a configuration of a temperature-compensating circuit of the present invention. The temperature-compensating circuit performs temperature compensation of a detected value from a pressure-detecting section 39 for detecting a pressure as a voltage value by a pressure sensor. The temperature-compensating circuit is put under the same environment as the pressure sensor and mounted on a semiconductor integrated circuit having the same ambient temperature as the pressure sensor. The temperature-compensating circuit comprises an offset-drift-constant temperature-compensating circuit 10, a voltage-generating source 34, an adding circuit 35, a pressure-sensor-voltage-amplifying circuit 40, a span-shift-temperature-coefficient first degree compensating circuit 45, and a span-shift-temperature-coefficient second degree compensating circuit 47.

The offset-drift-constant temperature-compensating circuit 10 is a circuit for compensating the offset drift of an output voltage of the pressure-detecting section 39 for a temperature. That is, the offset-drift-constant temperature-compensating circuit 10 is a circuit for generating a voltage corresponding to an error voltage component generated in accordance with an offset drift constant. The voltage-generating source 34 generates a predetermined voltage by a variable resister 6. The pressure-sensor-voltage-amplifying circuit 40 amplifies a detected signal sent from the pressure-detecting section 39. The adding circuit 35 adds outputs supplied from the offset-drift-constant temperature-compensating circuit 10, voltage-generating source 34, and amplifying circuit 40. An added result is input to the span-shift-temperature-coefficient first degree compensating circuit 45, and temperature-compensation is applied to a span-shift temperature coefficient. In an output supplied from the span-shift-temperature-coefficient first degree compensating circuit 45, a second degree temperature coefficient, is compensated in temperature by the span-shift-temperature-coefficient second degree compensating circuit 47. Then a detection result finally temperature-compensated by an output terminal 48 is obtained. Detail of each circuit block will be described later.

<2. Offset-Drift-Constant Temperature-Compensating Circuit>

Figure 2A:
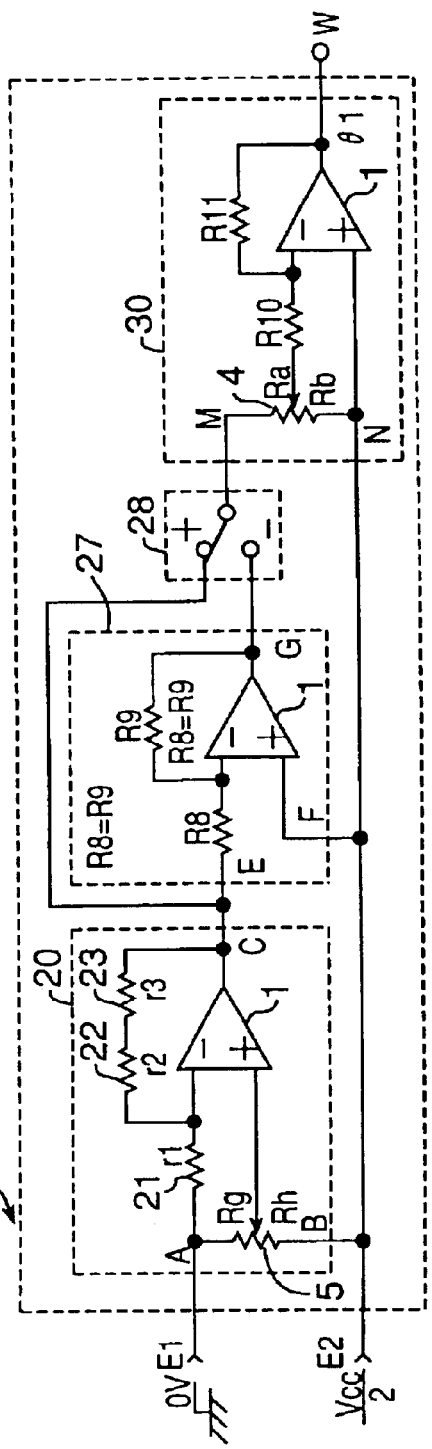
FIGS. 2A and 2B are circuit diagrams of an offset-drift-constant temperature-compensating circuit in the first embodiment of the present invention.

FIG. 2A shows a configuration of the offset-drift-constant temperature-compensating circuit 10. The offset-drift-constant temperature-compensating circuit 10 has a function for generating a voltage +cβ(ta−ts) or −cβ(ta−ts) to a voltage cβ(ta−ts) which is a product of an offset drift constant β and a temperature (ta−ts) included in a pressure-sensor output voltage obtained from the expression (3).

As shown in FIG. 2A, the offset-drift-constant temperature-compensating circuit 10 includes a first degree temperature-coefficient-generating circuit 20 which uses the circuit shown in FIG. 14D2, a temperature-coefficient-signinverting circuit 27 which uses the circuit shown in FIG. 14A, a sign-switching circuit 28, and a first degree temperature-coefficient-circuit 30 which uses the circuit shown in FIG. 14D1.

The first degree temperature-coefficient-generating circuit 20 comprises an operational amplifier 1, a variable resistor 5, and resistors 21, 22, and 23. The resistors 21, 22, and 23 have different first and second degree temperature coefficients each other, and have resistance values r1, r2, and r3, respectively. Resistors formed on a semiconductor integrated circuit are used as the resistors 21, 22, and 23. The first degree temperature-coefficient-generating circuit 20 is constituted so that voltage amplification factors are linearly changed according to a temperature change.

The temperature-coefficient-sign-inverting circuit 27 is an inverter circuit which is obtained from the circuit shown in FIG. 13A in which resistance values of resistors are set to R8=R9 to provide a voltage amplification factor which is 1.

The sign-switching circuit 28 serves as an analog switch and selects either of signal voltages obtained from an output C of the first degree temperature-coefficient-generating circuit 20 and an output G of the temperature-coefficient-sign-inverting circuit 27.

Figure 2B:
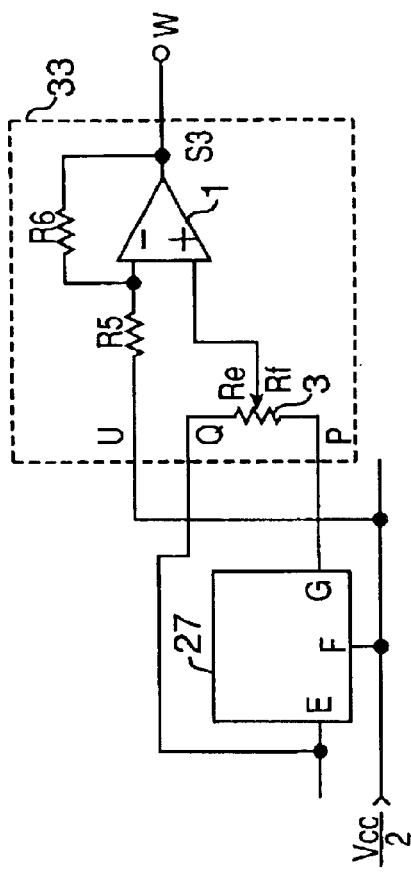

The first degree temperature-coefficient-adjusting circuit 30 has a circuit configuration same as that in FIG. 14D1. The first degree temperature-coefficient-adjusting circuit 30 adjusts a first degree temperature coefficient of a signal received through the sign-switching circuit 28. In this case, a first degree temperature-coefficient-adjusting circuit 33 having the same configuration as the circuit in FIG. 14C as shown in FIG. 2B may be used instead of the first degree temperature-adjusting circuit 30 and the sign-switching circuit 28.

The transfer function C of the operational-circuit block 20 shown in FIG. 2A is shown by the following expression in accordance with the expression (27).

$$C = A + D4\{1+(r2+r3)/(r1)\}(B-A) \quad (40)$$

$$D4 = Rg/(Rg+Rh)$$

By forming resistors of Rg and Rh constituting the variable resistor 5 by the same type of resistors on the chip surface of an integrated circuit, it is possible to equalize temperature coefficients of the resistance values of Rg and Rh. Therefore, the value of Rg/+Rh) does not depend on temperature.

An integrated circuit may have three types of diffusion layers applicable to resistance diffusion. When using these diffusion layers to form resistors, the resistors having three types of temperature coefficients which are different from each other can be obtained. Resistance values of these resistors are assumed as r1, r2, and r3. Resistance values of the resistors formed by the diffusion layers change depending on temperature. These resistance values are changed not linearly but like a quadratic curve (that is, like a quadratic function) and can be approximately shown by the following expressions.

$$r1 = R1\{1+(\alpha 1)t+(\alpha 2)t^2\} \quad (42)$$

$$r2 = R2\{1+(\beta 1)t+(\beta 2)t^2\} \quad (43)$$

$$r3 = R3(1+(\gamma 1)t+(\gamma 2)t^2) \quad (44)$$

$$t = ta - ts$$

where, ta denotes an ambient temperature (° C.) of each resistor, which ranges between −40° C. and +125° C., ts denotes a reference temperature which ranges between −30° C. and +40° C., and R1, R2, and R3 denote resistance values of resistors r1, r2, and r3 at an ambient temperature ta=ts. Moreover, $\alpha 1$ and $\alpha 2$ denote first degree and second degree temperature coefficients about $t=(ta-ts)$ and $t^2=(ta-ts)^2$ of the resistor R1, $\beta 1$ and $\beta 2$ denote first degree and second degree temperature coefficients about $t=(ta-ts)$ and $t^2(ta-ts)^2$ of the resistor R2, and $\gamma 1$ and $\gamma 2$ denote first degree and second degree temperature coefficients about $t=(ta-ts)$ and $t^2(ta-ts)2$ of the resistor R3.

For integrated circuit, temperature coefficients of resistances at an ambient temperature ta of −40° C. to +125° C. are shown below.

$$\alpha 1 - 0.7 \times 10^{-3}, \alpha 2 = 2 \times 10^{-6}, \beta 1 = 6.3 \times 10^{-3}, \beta 2 = 14 \times 10^{-6},$$
$$\gamma 1 = 1.5 \times 10^{-3}, \gamma 2 = 0.2 \times 10^{-6} \quad (45)$$

When rearranging the term of $\{1+(r2+r3)/r1\}$ in the expression (40) by using the expressions (42), (43), and (44), the following expressions are obtained.

$$1+(r2+r3)/r1 = \{1+(R2+R3)/(R1)\}\{1+(\theta 1)t+(\theta 2)t^2\}/\{1+(\alpha 1)t+(\alpha 2)t^2\} \quad (46)$$

where $$(\theta 1) = \{R1(\alpha 1)+R2(\beta 1)+R3(\gamma 1)\}/(R1+R2+R3) \quad (47)$$

$$(\theta 2) = \{R1(\alpha 2)+R2(\beta 2)+R3(\gamma 2)\}/(R1+R2+R3) \quad (48)$$

Moreover, expansion of $\{1+\theta 1\}t+(\theta 2)t^2\}/\{1+(\alpha 1)t+(\alpha 2)t^2\}$ into a power series about t provides the following expression.

$$\{1+(\theta 1)t+(\theta 2)t^2\}/\{1+(\alpha 1)t+(\alpha 2)t^2\} = 1+xt+yt^2+zt^3+wt^4 \quad (49)$$

where x, y, z, w, . . . denote coefficients of first, second, . . . power of t, which are positive or negative real numbers.

Therefore, the expression (40) is deformed into the following expression.

$$C = A + \{Rg/(Rg+Rh)\}\{(R1+R2+R3)/R1\}(B-A)(1+xt+yt^2+zt^3+wt^4 \ldots) = A + a(B-A)(1+xt+yt^2+zt^3+wt^4 \ldots) \quad (50)$$

where $a = \{Rg/(Rg+Rh)\}\{1+(R2+R3)/(R1)\}$.

Thus, the transfer function between the input terminals A and B and the output terminal C can be shown by a power series of t. The voltage amplification factor at $a(1+xt+yt^2+zt^3+wt^4 \ldots)$ denotes a voltage amplification factor at the temperature t.

Moreover, the following relations (53) to (57) are obtained from the expression.

$$x = (\theta 1) - (\alpha 1) \quad (53)$$

$$y = (\theta 2) - (\alpha 2) - x(\alpha 1) \quad (54)$$

$$z = -y(\alpha 1) - x(\alpha 2) \quad (55)$$

$$w = -z(\alpha 1) - y(\alpha 2) \quad (56)$$

$$u = -w(\alpha 1) - z(\alpha 2) \quad (57)$$

By substituting the temperature coefficient shown by the expression (45) for these expressions, values of x, y, and z are obtained.

Resistors having three types (or two types) of different first degree and second degree temperature coefficients are used for the resistors 21 to 23 having resistance values of r1, r2, and r3, is as follows. This is because a transfer function in which the voltage amplification factor of $a(1+xt+yt^2+zt^3+wt^4 \ldots)$ linearly changes against a temperature t is obtained to provide a first degrees temperature-coefficient-generating circuit which is necessary for the present invention. By approximating the expression (50) to the following expression (61), obtained is an input/output transfer function having only a first degree temperature coefficient about t at an ambient temperature ta between $-40°$ C. and $+125°$ C. To do so, three types of resistors having different temperature coefficients are used for the resistances 21 to 23.

$$C=A+a(B-A)(1+xt+yt^2+zt^3+wt^4 \ldots) \quad (59)$$

$$C \approx A+a(1+xt)(B-A) \quad (61)$$

In the case of the prior art, it is impossible to set a coefficient such as y=z=w . . . =0. In this embodiment, however, appropriate resistance values are selected by using resistors having three types of temperature coefficients different from each other, thereby decreasing the influence of the value of $yt^2+zt^3+wt^4$ . . . in an operating-temperature range to improve linearity. Thus the expression (50) having a linearity considerably close to the expression (61) can be obtained.

Approximation degrees of the expressions (59) and (61) are evaluated below. The expression (59) is deformed into the following expression.

$$C=A+a(B-A)[1+xt\{1+(yt^2+zt^3+wt^4 \ldots )/(xt)\}] \quad (62)$$

where $\epsilon$ is set to $t(y+zt+wt^2+ut^3 \ldots)$. $\epsilon$ shows a fluctuation rate of a first degree temperature coefficient x. The following expression (65) is obtained from the expression (62).

$$C=A+a\{1+x(1+\epsilon)t\}(B-A) \quad (65)$$

where, $a\{1+x(1+\epsilon)t\}$ denotes a voltage amplification factor and its temperature coefficient is equal to $x(1+\epsilon)$. In this case, if $\epsilon$ is equal to 0 irrespective of t, the expression (65) denotes a complete first degree linear expression about t. However, $\epsilon$ is not equal to 0 in general. Therefore, when $|\epsilon|$ has a value of about 5% or less, the expression (65) can be regarded as a linear expression about t for practical use. In this case, the following expression is obtained.

$$C=A+a(B-A)(1+xt) \quad (65c)$$

In general, the expression (65c) is used for rough calculation and study and a total error is calculated in accordance with the expression (65) including $\epsilon$.

For example, the total error is calculated by using the value of the temperature coefficient shown in the expression (45). By assuming R1=3, R2=1.1302, and R3=3.8697 and substituting values of $\alpha 1, \alpha 2, \beta 1, \beta 2, \gamma 1,$ and $\gamma 2$ shown in the expression (45) for the expressions (47), (48), and (53) to (57), the following expressions are obtained.

$$(\theta 1)=1.8781 \times 10^{-3} \quad (68)$$

$$(\theta 2)=2.8247 \times 10^{-6} \quad (69)$$

$$x=1.178 \times 10^{-3} \quad (70)$$

$$y=0 \quad (71)$$

$$z=-2.356 \times 10^{-9} \quad (72)$$

$$w=1.649 \times 10^{-12} \quad (73)$$

$$u=3.055 \times 10^{-15} \quad (74)$$

When substituting these expressions for the expression (63) and calculating $\epsilon$ at ts=25° C. and ta=125° C., that is, at t=100° C., $\epsilon=-1.84\%$ is obtained. Moreover, at ta=-45° C., that is, t=-70° C., $\epsilon=-1.02\%$ is obtained. At ta=-65° C., that is, t=-90° C., $\epsilon=-1.70\%$ is obtained. At ta=ts, $\epsilon=0\%$ is obtained. Therefore, in an operating temperature range of -65° C. to 125° C., it is found that linearity is kept at an error between 0% and -2%. Thus, there is no problem in practically using the expression (65).

As described above, by constituting the resistors 21, 22, and 23 having the resistance values r1, r2, and r3 so as to have the combination of three types of temperature coefficients as shown above, it is possible to constitute an operational circuit of which temperature coefficient of a voltage amplification factor to a differential input voltage can be shown by a first degree (or linear) expression. In the temperature compensating circuit, the operational circuit of which transfer function can be shown by the expression (65c) needs to have a voltage amplification factor with a first degree temperature coefficient. The circuit is used as the first degree temperature-coefficient-generating circuit 20. The first degree temperature coefficient x is set to $c\beta$ shown by the expression (3) by adjusting values of the variable resistors 4 and 3 included in the first degree temperature-coefficient-adjusting circuits 30 and 33.

Then, studied is the linearity of the temperature coefficient of $(1+r2/r1)$ when the first degree temperature-coefficient-generating circuit 20 is simply constituted with r3=0 in the expression (45) and r1 and r2 being composed of two types of resistors each having different temperature coefficient.

When using the coefficients shown in the expression (45) for the expressions (47) and (48) in the case of R3=0, R2=5, and R1=3, $(\theta 1)=4.2 \times 10^{-3}$ and $(\theta 2)=9.5 \times 10^{-3}$ are obtained. $x=3.5 \times 10^{-3}$, $y=5.05 \times 10^{-6}$, $z=10.53 \times 10^{-9}$, and $w=-2.725 \times 10^{-12}$ are obtained from the expressions (53) to (56). Therefore, $\epsilon$ at ts=25° C., ta=125° C., and t=100° C. is shown by the following expression (79) in accordance with the expression (63).

$$\epsilon=11.4\% \quad (79)$$

Moreover, at t=-70° C., $\epsilon 11.5\%$ is obtained. As a result of comparing the result of the expression (75) with that of the expression (79), the linearity of the expression (75) is improved about 6 times higher than that of the expression (79) Thus, it is found that it is very effective to use resistors having three types of temperature coefficients of the present invention by combining them.

To provide more linearity for the expression (65), there are the following three methods for calculating R1, R2, and R3 in order to minimize $|\epsilon|$ in an operating-temperature range.

1) In the expression (63), temperature coefficients mathematically have the relation of $|x|>|y|>|z|>|w|>|u|$. . . . Therefore, a term in expression about t which most influences linearity is $|y|$ of the second degree temperature coefficient term. Therefore, in the expression (54), R2 and R3 are decided so that y is equal to 0.

2) An operating-temperature range and a reference temperature range are decided to decide (R2+R3)/R1. R2 and R3 are changed while keeping (R2+R3)/R1 constant. The numerical calculation for changing R2 and R3 is performed so as to minimize $|\epsilon|$. In this case, y is not equal to 0.

3) Unknown quantities are obtained in accordance with the least square method by deciding an operating-temperature range and a reference temperature, using the expressions (47), (48) and (49) with R2, R3 and x to be unknown quantities while keeping (R2+R3)/R1 constant. In this case, the left side of the expression (52) is set to y=z=w=u= . . . =0 in order to approximate the left side to a linear expression 1+xt.

$$P=\Sigma[\{1(\theta 1)t+(\theta 2)t^2/\{1+(\alpha 1)t+(\alpha 2)t^2\}-(1+xt)]^2 \quad (80)$$

P is differentiated with R2, R3, or x, respectively. The three expressions obtained by the differentiation are equal to zero. t=t1, t=t2, . . . in an operating-temperature range is substituted into the respective expression to obtain the sum. Solving the obtained simultaneous equations can provide R2, R3 and x.

Obtained values are close to each other by using any one of the above calculation methods. In this case, the most generally used method is the above method of 1) or 2). These methods can be implemented as described as follows. Moreover, the above three types of calculation methods can be applied to all first degree temperature-coefficient-generating circuits described below.

The method of 1) is as follows.

$$R2=kR,\ R3=(1-K)R,\ R2+R3=R \tag{81}$$

By defining the above variable k as ($0 \leq k \leq 1$), substituting the expressions (81), (47), (48), and (53) for the expression (54), setting y in the expression (54) to 0, and solving about k, the following expression is obtained.

$$k=\{(\alpha 2)-(\gamma 2)+(\alpha 1)\{(\gamma 1)-(\alpha 1)\}\}/[(\beta 2)-(\gamma 2)+(\alpha 1)\{(\gamma 1)-(\beta 1)\}] \tag{83}$$

R2 and R3 are obtained from the above k.

The above expressions (68) to (74) show results of obtaining k=0.2260, R2=1.1302, R3=3.8697, and each temperature coefficient by setting R1 to 3 and R to 5 and performing calculations in accordance with the expressions (45), (47), (48), (53) to (57), and (83). $|\epsilon|<1.84\%$ is obtained in a range of $-60°$ C.$\leq$ta$\leq 125°$ C.

The method of 2) is described below. The expression (81) is substituted for the expressions (47) and (48) and the following expressions are obtained.

$$(\theta 1)=[(\alpha 1)+\{(\beta 1)k+(\gamma 1)(1-k)\}R/R1]/(1+R/R1) \tag{85}$$

$$(\theta 2)=[(\alpha 2)+\{(\beta 2)k+(\gamma 2)(1-k)\}R/R1]/(1+R/R1) \tag{86}$$

From the expressions (49) and (63), the following expression is obtained.

$$\{1+(\theta 1)t+(\theta 2)t^2\}/\{1+(\alpha 1)t+(\alpha 2)t^2\}=1+xt(1+\epsilon) \tag{87}$$

$t=ta-ts$

In the numerical calculation, R/R1, k, and reference temperature ts are decided to obtain ($\theta 1$) and ($\theta 2$). Values x, y, z, w, . . . are obtained from the expressions (53) to (57) to successively calculate $\epsilon$ related to t corresponding to an operating-temperature range in accordance with the expression (63) or (87) Then, by slightly changing the value of k and recalculating x, y, z, . . . , $\epsilon$ related to an operating-temperature range t is successively calculated. By repeating the above operation, k which provides minimum of $|\epsilon|$ in an operating-temperature range is obtained. Then, R2 and R3 are obtained from the expression (81) in accordance with the above k. The initial value of k may be obtained in accordance with the above method of 1).

When calculating $\epsilon$ where R1=3, R=5, k=0.25, and ts=25° C. in accordance with the method of 2), $\epsilon$ is determined to be $-0.69\%$ at ta=125° C. (that is, at t=100° C.). $\epsilon$ is determined to be 0.20% at ta=55° C., that is, at t=30° C. Moreover, $\epsilon$ becomes $-1.93\%$ at ta=$-45°$ C., that is, at t=$-70°$ C. Furthermore, $\epsilon$ becomes $-2.9\%$ at ta=$-65°$ C., that is, at t=$-90°$ C. Furthermore, $\epsilon$ is determined to be 0% at ta=ts. Thus, it is found that linearity is kept while an error is kept in a range between 0% and $-2\%$ in an operating-temperature range of $-45°$ C. to $+125°$ C. Temperature coefficients in the above case are obtained as shown below by using the expressions (53) to (57).

$$x=1.2\times 10^{-3},\ y=0.15\times 10^{-6},\ z=-2.505\times 10^{-9},\ W=1.4532\times 10^{-2},\ u=3.987\times 10^{-15} \tag{94}$$

Moreover, R2=1.25 and R3=3.75 are obtained from the expression (81).

From the above two examples, $|\epsilon|<2\%$ showing the linearity of x is obtained in an operating-temperature range. Therefore, any result can be used.

In the expression (65c), a voltage E1 is applied to the input terminal A, a voltage E2 is applied to the input terminal B, and a voltage amplification factor is set to a=1.

$$C=E1+(E2-E1)(1+xt) \tag{96}$$

The above expression (96) has a temperature coefficient x for a differential voltage (E2-E1). In this case, applying E2=Vcc/2 where E1 is 0V and power-supply voltage is Vcc, the following expression (97a) is obtained.

$$C=Vcc/2+(Vcc/2)xt \tag{97a}$$

In the case of Vcc=5V, C=2.5+2.5xt is obtained and the first degree temperature coefficient x increases to 2.5x. In order for setting of a=1, when R1=3 and R2+R3=5, it is set that 1+(R2+R3)/R1=8/3 and Rg/(Rg+Rh)=3/8. Therefore, even if resistance values are fluctuated in fabrication, it is possible to set a=1 at a reference temperature (ts) by adjusting the position of the slider of a variable resistor.

The output voltage C obtained from the expression (96) is applied to the input terminal E of the inverter circuit 27 in which R8 is equal to R9 in the circuit diagram shown in FIG. 9A. A transfer function is shown by the expression (12) or (13) and an output G is obtained by applying a voltage Vcc/2 to the terminal F.

$$G=Vcc/2-(Vcc/2)xt \tag{97b}$$

The expression (97a) is the same as the expression (97b) except that the sign of (Vcc/2)xt is inverted from positive to negative. From, the expression (97a), a first degree temperature coefficient +(Vcc/2)x is obtained from the output terminal C. A temperature coefficient $-$(Vcc/2)x with the inverted sign is obtained from the output terminal G by the expression (97b). An operational-circuit block 27 outputs a voltage obtained by inverting the sign of a temperature coefficient.

Either of output voltages shown by the expressions (97a) and (97b) is selected by the sign changing circuit 28. When the output voltage is applied to the input terminal M of the first degree temperature-coefficient-setting circuit 30 shown in FIG. 14D1, or the voltage Vcc/2 is applied to the input terminal N, the following output voltages are obtained at an output terminal $\theta 1$ in accordance with the expressions (25) and (26).

When an output voltage according to the expression (97a) is selected:

$$\theta 1=Vcc/2-(D1\cdot R11/R10)x(Vcc/2)t \tag{98a}$$

When an output voltage according to the expression (97b) is selected:

$$\theta 1=Vcc/2+(D1\cdot R11/R10)x(Vcc/2)t \tag{98b}$$

By changing position of the slider of the variable resistor 5 to change D1, an output voltage equivalent to a voltage appeared when the first degree temperature coefficient x is changed is obtained from an output terminal θ1. Therefore, Changing D1 and setting (D1·R1/R10)(Vcc/2)x=cβ provides the output shown by the following expression.

$$\theta 1 = Vcc/2 - c\beta t \text{ or } \theta 1 = Vcc/2 + c\beta t \qquad (100)$$

where cβ denotes an offset drift constant included in a detected voltage V calculated from a pressure sensor shown by the expression (3).

Moreover, the output voltage shown by the expression (97a) or (97b) is connected to the input terminals Q and P of the first degree temperature-coefficient-adjusting circuit 33. The first degree temperature-coefficient-adjusting circuit 33 uses the circuit shown in FIG. 14C. When applying the voltage Vcc/2 to an input terminal U, the following output voltage is appeared at the output terminal S3 in accordance with the expressions (20), (21), and (28).

$$S3 = Vcc/2 + \{2(D3) - 1\}(R6/R5)x(Vcc/2)t \qquad (102)$$

By moving the slider of the variable resistor 3, D3 varies as 0≦D3≦1. Therefore, while D3 changes from 0 through ¼ ½ and ¾ to 1, {2(D3)}−1} changes from −1 through −0.5, 0 and +0.5 to +1. Therefore, by changing position of the slider, a position in which the value of {2(D3)−1} (R6/R5) (Vcc/2)x is equal to cβ (or −cβ) can be found, and the slider can be fixed at the position.

$$S3 = Vcc/2 + c\beta t \text{ or } S3 = Vcc/2 - c\beta t \qquad (103)$$

The expression (103) is the same as the expression (100). This circuit does not require an analog switch used for the sign changing circuit 28. However, the resolution of the variable resistor 3 is lowered to a half of the resolution of the variable resistor 4 in the circuit block 30. The first degree temperature-coefficient-adjusting circuits 30 or 33 respectively adjusts the value of the temperature coefficient x by adjusting the value of the variable resistor 3 or 4. Any one of the first degree temperature-coefficient-adjusting circuits 30 and 33 may be used because the same output signal voltage is obtained from the circuits 30 and 33.

According to the expression (98), by feeding a voltage obtained by dividing a power-supply voltage to the offset-drift-constant temperature-compensating circuit 10, the offset drift constant cβ included in an output of the offset-drift-constant temperature-compensating circuit 10 becomes a value proportional to the fluctuation of the power-supply voltage. Moreover, the offset drift constant cβ included in a detected voltage by the pressure sensor is also proportional to the output of the power-supply voltage. Therefore, the offset drift constant cβ included in the detected voltage by the pressure sensor and the offset drift constant cβ included in the output of the offset-drift-constant-compensating circuit 10 are added and canceled each other in the adding circuit 35. Thereby, it is possible to exclude the influence of the fluctuation of the power-supply voltage by a temperature-compensating circuit.

<3. Pressure-Detecting Section, Voltage-Generating Source, Adding Circuit, and so on>

In FIG. 1, the adding circuit 35 is the same as the circuit shown in FIG. 14G, which adds signals applied to the input terminals V, W, and X each other and outputs the addition result to the output terminal Z. The voltage-generating-source block 34 has a variable resistor 6 and voltages Vcc and 0 are applied to both ends of the variable resistor 6. By changing positions of the slider of the variable resistor 6, the following voltage is generated at the output terminal S2.

$$S2 = Vcc/2 - B \text{ or } S2 = Vcc/2 + B \qquad (104)$$

where, B denotes the offset voltage shown by the expression (3) at the detected voltage obtained from the pressure sensor.

The pressure-detecting section 39 outputs the detected voltage u shown by the expression (1) between output terminals p1 and p2. The sensor-voltage-amplifying circuit 40 is a circuit for amplifying a voltage supplied from the pressure-detecting section 39, for which the circuit (transfer function L) in FIG. 14E is used. By applying Vcc/2 to an input terminal J, the following output voltage L is appeared at the output terminal L of the operational circuit 40 as an amplified output voltage in accordance with the expression (37).

$$L = Vcc/2 + (R81/R71)u = Vcc/2 + AP(1 + \alpha t) + c\beta t + B \qquad (105)$$

$$A = (R81/R71)a, \ c = (R81/R71), \ t = ta - ts$$

In the adding circuit 35, when applying Vcc/2 to the input terminal Y, voltage S2=Vcc/2−B to the input terminal x, θ1=Vcc/2−cβt to the input terminal w, and the voltage shown by the expression (105) to the input terminal V, a voltage Z appears at the output terminal in accordance with the expression (38).

$$Z = Vcc/2 - (R21/R14)\{AP(1+\alpha t) + c\beta t + B\} + \qquad (106)$$
$$(R21/R15)(c\beta t) + (R21/R16)B$$

In this case, when setting resistance values to R14=R15=R16, a voltage term due to an offset drift constant β and offset voltage b (or B) is canceled.

$$Z = Vcc/2 - A(R21/R14)(1 + \alpha t)P \qquad (107)$$

Thus, the pressure detection voltage Z including only a span-shift temperature coefficient α is obtained from the output terminal 2 as a central value (reference value).

The expression (107) may be available in a case of β>0. In the case of β<0, θ1=Vcc/2+cβt in the expression (100) is applied to the input terminal w. In the case of offset voltage b<0, the output voltage shown by the expression (107) is obtained by adjusting the slider of the variable resistor 6 so that the voltage S2=Vcc/2+B is generated instead of the expression (39).

<4. Span-Shift-Temperature-Coefficient First Degree Compensating Circuit>

The span-shift-temperature-coefficient first degree compensating circuit 45 is described below in detail. The span-shift-temperature-coefficient first degree compensating circuit 45 compensates a detected-pressure voltage depending on temperature, particularly, compensates the first degree component of a temperature characteristic for temperature fluctuation. The span-shift-temperature-coefficient first degree compensating circuit 45 obtains an output voltage Vo corresponding to the expression (4). Moreover, a span-shift-temperature-coefficient second degree compensating circuit 47 obtains an output voltage Voo corresponding to the expression (5). It is necessary for the offset-drift-constant temperature-compensating circuit 10, span-shift-temperature-coefficient first degree compensating circuit 45, and span-shift-temperature-coefficient second degree compensating circuit 47 to have a temperature equal to the temperature ta of the pressure-detecting section 39. That is, the span-shift-temperature-coefficient first degree compensating circuit 45 removes the fluctuation component due to the first degree term of a temperature coefficient of the temperature fluctuation component of an input signal.

FIG. 3A shows a specific circuit configuration of the span-shift-temperature-coefficient first degree compensating circuit 45. The span-shift-temperature-coefficient first degree compensating circuit 45 comprises a first degree temperature-coefficient-generating circuit 20b, a temperature-coefficient-sign-inverting circuit 27b, a sign-switching circuit 28b, and a first degree temperature-coefficient-adjusting circuit 30b. Operational-circuit blocks 20, 27, 30, and 33 and an analog switch 28 included in the offset-drift-constant temperature-compensating circuit 10 shown in FIG. 2 can be directly applied to circuit blocks of the span-shift-temperature-coefficient first degree compensating circuit 45. In this case, reference numerals of corresponding circuit blocks are provided with 20b, 27b, 28b, 30b, and 33b in order to distinguish them from the circuit blocks included in the offset-drift-constant temperature-compensating circuit 10. The circuit configuration shown in FIG. 3 is an example. The expressions (10) to (96) serving as design methods of the resistors 21 to 23 used as temperature sensors described for the first embodiment can be directly applied to this circuit 45.

By setting E1=Vcc/2 in the expression (96) and applying the signal voltage Z shown by the expression (107) to E2, the output Cb of the first degree temperature-coefficient-generating circuit 20b is shown by the following expression.

$$Cb = Vcc/2 + (Z - Vcc/2)(1 + xt) \quad (110a)$$
$$= Z + (Z - Vcc/2)xt$$

In the above expression, when 1+(R2+R3)/R1 is equal to 8/3, Rg/(Rg+Rh) is set to 3/8. Therefore, even if resistance values on fabrication are not constant, amplification factor is set so that a=1 at a reference temperature by adjusting the variable resistor 5.

The output voltage Cb obtained from the expression (110a) is applied to the input terminal E of the temperature-coefficient-sign inverting circuit 27b in which R8 is equal to R9 in the circuit diagram shown in FIG. 13A. Because a transfer function is shown by the expression (12) or (13), a voltage appearing on an output terminal Gb is obtained from the following expression.

$$Gb = Z - (Z - Vcc/2)xt \quad (110b)$$

Comparing expression (110a) with expression (110b), the expression (110a) is the same as the expression (110b) except that the sign of (Z−Vcc/2)xt is inverted from positive to negative. Thus, the temperature-coefficient-code-inverting circuit 27b outputs a voltage with a sign which is obtained by inverting a sign of a temperature coefficient.

Either of the outputs Cb and Gb is selected by the sign-switching circuit 28b and applied to the input terminal M of the first degree temperature-coefficient-adjusting circuit 30b. When the output Cb is selected, the following output voltage is obtained from the output terminal θ1.

$$\theta 1b = Z - (D1 \cdot R11/R10)(Z - Vcc/2)xt \quad (112a)$$

$$= Vcc/2 - A(R21/R14)(1 + \alpha t)\{1 - (D1 \cdot R11/R10)xt\}P \quad (112b)$$

When the output Gb is selected, the following expressions are obtained.

$$\theta 1b = Z + D1 \cdot R11/R10)(Z - Vcc/2)xt \quad (114a)$$

$$= Vcc/2 - A(R21/R14)\{1 - (-\alpha)t\}\{1 + (D1 \cdot R11/R10)xt\}P \quad (14b)$$

By adjusting the variable resistor 4 and thereby changing values of D1, it is possible to change values of (D1·R11/R10)x serving as a first degree temperature coefficient term.

In the case of α>0, D1 is adjusted in the expression (112b) and (D1·R11/R10)x is set to a to obtain the following expression.

$$\theta 1b = Vcc/2 - A(R21/R14)(1 - \alpha^2 t^2)P \quad (116a)$$

In the case of α<0 (that is, in the case of −α>0), D1 is adjusted in the expression (114b) and (D1·R11/R0)x=−α>0 is set to obtain the following expression.

$$\theta 1bb = Vcc/2 - A(R21/R14)\{1 - (+\alpha)(-\alpha)t^2\} \quad (116b)$$

The expressions (116a) and (116b) are the same. These expressions correspond to the expression (4).

The expressions (116a) and (116b) are approximate expressions. The more accurate expression including ε is shown below.

$$\theta 1cb = Vcc/2 - A(R21/R14)(1+\alpha t)(1-\alpha(1+\epsilon)t)P \quad (117a)$$

or $$\theta 1db = Vcc/2 - A(R21/R14)(1+\alpha t)\{1-(-\alpha)(1+\epsilon)t\}P \quad (111b)$$

Thus an output voltage to which the first degree term of t is canceled is obtained from the span-shift-temperature-coefficient first degree compensating circuit 45 through a terminal θ1b.

Moreover, as shown in FIG. 3B, the first degree temperature-coefficient-adjusting circuit 33b may be used instead of the first degree temperature-coefficient-adjusting circuit 30b. In this case, the sign-switching circuit 28b is not used. The first degree temperature-coefficient-adjusting circuit 33b has the same configuration as the circuit shown in FIG. 14C. The output voltage S3b of the first degree temperature-coefficient-adjusting circuit 33b is obtained from the following expression.

$$S3b = Vcc/2 - A(R21/R14)P(1+\alpha t)[1+\{2(D3)-1\}(1+(R6/R5)xt] \quad (118)$$

By adjusting a value of the variable resistor 3, it is possible to change values of D3(0≦D3≦1). Therefore, by changing values of the variable resistor 3 and values of D3 to set a value of (2D3−1){1+(R6/R5)}x to α (or −α), the output voltage S3b shown by the following expression is obtained.

$$S3b = Vcc/2 - A(R21/R14)P(1-\alpha^2 t^2) \quad (119)$$

The same output voltage is obtained from the expressions (119) and (116). Therefore, it is possible to use either of the first degree temperature-coefficient-adjusting circuits 30b and 33b. The first degree temperature-coefficient-adjusting circuit 33b has an advantage that the code-changing analog switch 28 is unnecessary. However, the resolution of the variable resistor 3 is lowered to a half of the resolution of the variable resistor 4 of the circuit block 30.

<5. Span-Shift-Temperature-Coefficient Second Degree Compensating Circuit>

According to the span-shift-temperature-coefficient first degree compensating circuit 45, the signal voltage of the output terminal θ1b or S3b can cancel a term αt which is a first degree error generated due to the span-shift temperature coefficient α, as shown in expressions of (116a) to (119). However, a term −α²t² which is a second degree error is left. Therefore, for more complete temperature compensation, it is preferable to also cancel the second degree term of −α²t². For this reason, the circuit shown in FIG. 1 is provided with the span-shift-temperature-coefficient second degree compensating circuit 47 for canceling this second degree error component. That is, the span-shift-temperature-coefficient second degree compensating circuit 47 removes a fluctuation component due to the second degree term of a temperature coefficient included in the temperature fluctuation component of an input signal. The span-shift-temperature-coefficient second degree compensating circuit 47 is described below.

Figures 4A, 4B:
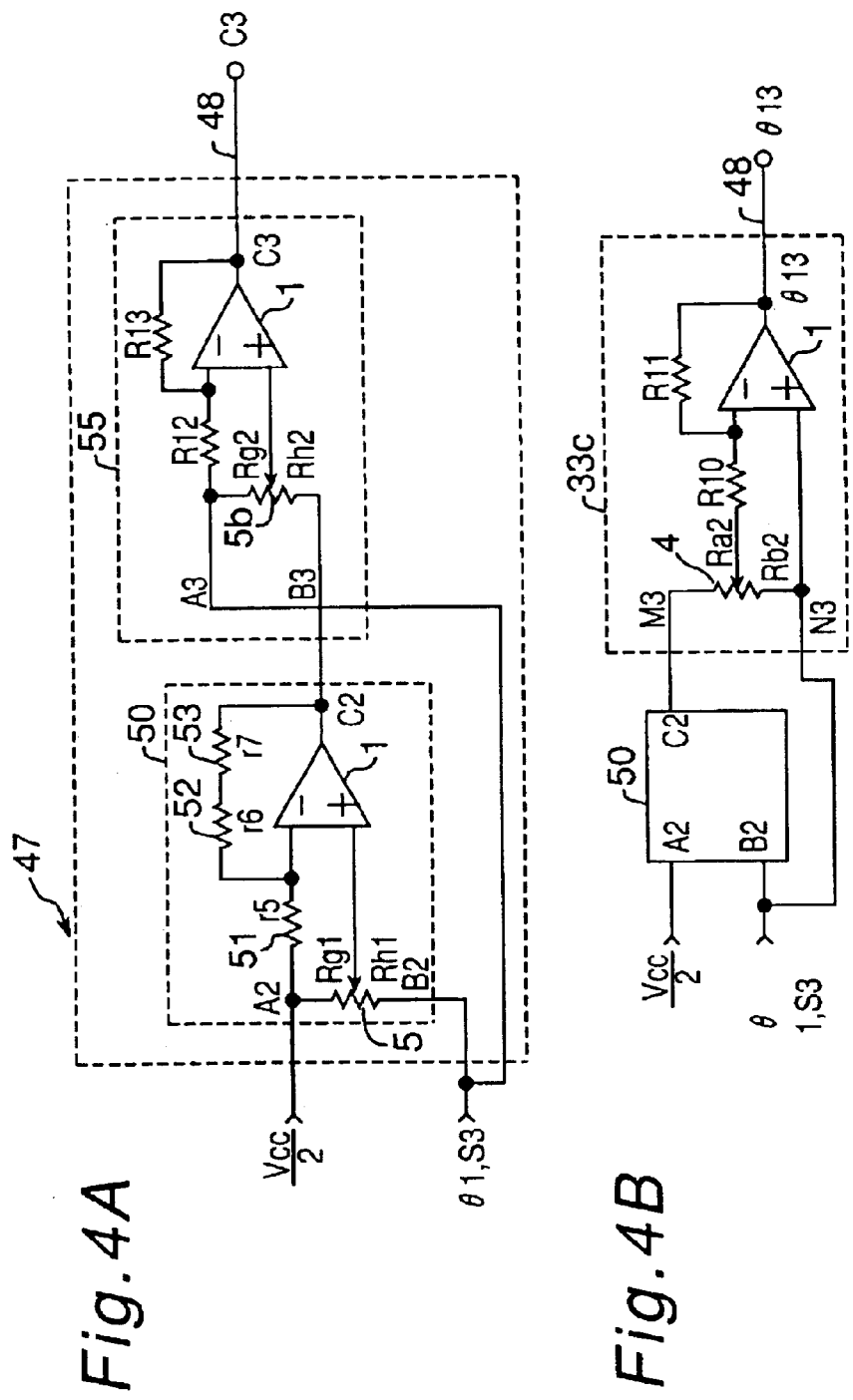
FIGS. 4A and 4B are circuit diagrams of a span-shift-temperature-coefficient second degree compensating circuit of the present invention.

The span-shift-temperature-coefficient second degree compensating circuit 47 compensates the second degree component of a detected-pressure voltage depending on temperature with temperature. FIG. 4A shows z circuit diagram of the span-shift-temperature-coefficient second degree compensating circuit 47 for canceling a second degree component. The span-shift-temperature-coefficient second degree compensating circuit 47 comprises a span-shift second degree temperature-coefficient-generating circuit 50 and a second degree temperature-coefficient-adjusting circuit 55. An output terminal 48 outputs a signal output voltage corresponding to the expression (5) to a voltage supplied from a pressure sensor. As shown in FIG. 4B, it is also permitted to use a second degree temperature-coefficient-adjusting circuit 33c may be used instead of the second degree temperature-coefficient-adjusting circuit 5S. Input signals to the circuit 47 include the output voltages θ1b and θ1bb or S3b and voltage Vcc/2 shown in expressions (116a) to (119).

The span-shift-second degree temperature-coefficient-generating circuit 50 has a second degree temperature characteristic in which a voltage amplification factor to an input voltage changes according to the second degree function of temperature t. This circuit originates from a circuit shown in FIG. 14D2. Moreover, the second degree temperature-coefficient-adjusting circuit 55 or 33c has the same configuration as the circuit shown in FIG. 14D1 or 14D2. The span-shift-second degree temperature-coefficient-generating circuit 50 has an operational amplifier 1, resistors 51, 52, and 53 having resistance values of r5, r6, and r7, and a variable resistor 5.

The span-shift-temperature-coefficient-generating circuit 50 uses three (or two) types of resistors having first degree and second degree temperature coefficients different from each other. An integrated circuit may have three types of diffusion layers applicable to resistance diffusion. By using these diffusion layers to form resistances, it is possible to obtain resistors having three types of temperature coefficients different from each other Resistance values of a resistor formed by each diffusion layer are not linearly changed but they are quadratically changed against a temperature change and they can be shown by the following expressions.

$$r5 = R5\{1+(\alpha a)t+(\alpha b)t^2\} \quad (120)$$

$$r6 = R6\{1+(\beta a)t+(\beta b)t^2\} \quad (121)$$

$$r7 = R7\{1+(\gamma a)t+(\gamma b)t^2\} \quad (122)$$

$$t = ta - ts$$

In the above expressions, ta denotes an ambient temperature (° C.) of each resistor and ranges between −40° C. and +125° C., ts denotes a reference temperature and ranges between −30° C. and +40° C. R5, R6 and R7 denote resistance values of the resistors 51, 52 and 53 at an ambient temperature ta=ts. Moreover, ($\alpha a$) and ($\alpha b$) denote first degree and second degree temperature coefficients relating to $t=(ta-ts)$ and $t^2=(ta-ts)^2$ of the resistor 51. ($\beta a$) and ($\beta b$) denote first degree and second degree temperature coefficients relating to $t=(ta-ts)$ and $t^2=(ta-ts)^2$ of the resistor 52.

($\gamma a$) and ($\gamma b$) denote first degree and second degree temperature coefficients relating to $t=(ta-ts)$ and $t^2=(ta-ts)^2$ of the resistor 53.

The transfer function of the span-shift second degree temperature-coefficient-generating circuit 50 shown in FIG. 4 is obtained by the following expressions.

$$C2 = A2 + D2\{1+(r6+r7)/r5\}(B2-A2) \quad (125)$$

$$D2 = \{Rg/(Rg+Rh)\}$$

When forming Rg and Rh constituting the variable resistor 5 by the same types of resistances on the chip face of an integrated circuit, it is possible to equalize temperature coefficients. Therefore, Rg/(Rg+Rh) has a value independent of a temperature change.

By substituting the expressions (120), (121), and (122) for 1+(r6+r7)/r5 included in the expression (125), the following expression is obtained.

$$\{1+(r6+r7)/r5\} = \{1+(R6+R7)/R5\}\{1+(\theta3)t+(\theta4)t^2\}/\{1+(\alpha a)t+(\alpha b)t^2\} \quad (127)$$

where, $$(\theta3)\{R5(\alpha a)+R6(\beta a)+R7(\gamma a)\}/(R5+R6+R7) \quad (128)$$

$$(\theta4) = \{R5(\alpha b)+R6(\theta b)+R7(\gamma b)\}/(R5+R6+R7) \quad (129)$$

In this case, developing $\{1+(\theta3)t+(\theta4)t^2\}/\{1+(\alpha a)t+(\alpha b)t\}$ into a power series about t, provides the following expression.

$$\{1+(\theta3)t+(\theta4)t^2\}/\{1+(\alpha a)t+(\alpha b)t\} = 1+xt+yt^2+zt^3+wt^4+ut5+\ldots \quad (130)$$

where, x, y, z, w, u, ... denote coefficients of first degree, second degree, ... of t and positive or negative real numbers. The expression (125) can be also shown as the following expression $$C2 = A1+a(B1-A1)(1+xt+yt^2+zt^3+wt^4\ldots) \quad (131)$$

where a=$\{Rg/(Rg+Rh)\}\{1+(R6+R7)/(R5)\}$.

The following relations are derived from the expression (130).

$$x = (\theta3)-(\alpha a) \quad (133)$$

$$y = (\theta4)-(\alpha b)-x(\alpha a) \quad (134)$$

$$z = -y(\alpha a)-x(\alpha b) \quad (135)$$

$$w = -z(\alpha a)-y(\alpha b) \quad (136)$$

$$u = -w(\alpha a)-z(\alpha b) \quad (137)$$

Substituting the temperature coefficient value shown by the expression (45) for these expressions provides values of x, y, z, w, and u. These expressions are the same as expressions (53) to (57).

The reason why resistors having three types of temperature coefficients different from each other are used for the resistances 51, 52, and 53, is to make a transfer function at the circuit shown in FIG. 14D2 approximate to a transfer function of which amplification factor changes about a temperature t as quadratically as close as possible.

That is, R6 and R7 are set so as to cancel the first degree temperature coefficient x about t. By setting x to 0 and including only second degree term or higher of a temperature coefficient in an input/output transfer function, an electrical circuit equivalent to the expression (4) is obtained. According to the above method, the following expression (140) is obtained from the expression (131).

$$C2 = A2 + a(B2-A2)(1+yt^2+zt^3+wt^4\ldots) \quad (140)$$

$$a = \{Rg/(Rg+Rh)\}\{(R5+R6+R7)/R5\}, \quad t = ta-ts.$$

The expression (140) serves as means for approximating to the following expression (141).

$$C2 \approx A1 + a(B2-A2)(1+yt^2) \quad (141)$$

To approximate the expression (131) as close to a value obtained from the expression (141) as possible, x=0 is a prerequisite.

As shown by the expression (140), the resistance values R5, R6, and R7 are obtained as described below. By assuming $x = (\theta 3)-(\alpha 1) = 0$ in the expression (133), substituting the expression (128) for the expression (133) and rearranging the expression (133), the following expression (142) is obtained.

$$R6/R7 = (\alpha a \alpha \beta a)/(\gamma a - \alpha a) \quad (142)$$

Moreover, by setting k for meeting the following expression (144), substituting the expression (142) for the expression (144), and rearranging the expression (144), the following expression (146) is obtained.

$$R6 = (k)Rf, \; R7p = (1-k)Rf, \; \text{and} \; R6+R7 = Rf \; (\text{Constant}) \quad (144)$$

$$k = (\alpha a - \gamma a)/(\beta a - \gamma a). \quad (146)$$

By substituting k obtained from the expression (146) for the expression (144), R6 and R7 are obtained.

As an example, R5 is set to 3 and Rf is set to 5 to perform calculation by using the temperature coefficient shown by the expression (45). To meet the expression (147), temperature coefficients are set as shown below.

$$\alpha a - 1.5 \times 10^{-3}, \; \alpha b = 0.2 \times 10^{-6}, \; \beta a = 0.7 \times 10^{-3}, \; \beta b = 2 \times 10^{-6}, \; \gamma a = 6.3 \times 10^{-3}, \; \gamma b = 14 \times 10^{-6} \quad (149)$$

By substituting the above values for the expressions (146) and (144), k=0.85714, R6=4.2857, and R7=0.71428 are obtained.

Results of calculations in accordance with the expressions (128), (129), and (133), to (137) with the above values are shown below.

$$\theta 3 = 1.5 \times 10^{-3}, \; \theta 4 = 2.39642 \times 10^{-6} \quad (150)$$

$$x=0, \; y=2.1964 \times 10^{31\,6}, \; z=-3.2946 \times 10^{-9}, \; W=4.502 \times 10^{-12},$$
$$u=-6.0950 \times 10^{-15}, \; v=8.0242 \times 10^{-18}, \; a=-11.144 \times 10^{-21} \quad (151)$$

There may be a case of y<0 depending on a temperature coefficient. Since x is equal to 0, the expression (130) is shown as the following expression (154).

$$\{1+(\theta 3)t+(\theta 4)t^2\}/\{1+(\alpha a)t+(\alpha b)t\} = 1+yt^2+zt^3+wt^4+ut^5+vt^6+at^7+\ldots \quad (154)$$

Degrees of approximation of the expressions (140) and (141) are evaluated below. The expression (140) is deformed as shown below.

$$C2 = A2 + a(B2-A2)[1+yt^2[1+\{zt^3+wt^4+ut^5\}\ldots]/(yt^2)\}]$$

Here, $\epsilon 2$ is set to $(zt^3+wt^4+ut^5 \ldots)/(yt^2)$.

$$\epsilon 2 = t(z+wt+ut^2+vt^3+\ldots)/y \quad (160)$$

The expression (140) is deformed into the following expression.

$$C2 = A1 + a\{1+y(1+\epsilon 2)t^2\}(B2-A2) \quad (161)$$

In the expression (161), $y(1+\epsilon 2)$ denotes the temperature coefficient of the second term of t of voltage amplification factor $a\{1+y(1+\epsilon 2)t^2\}$. Moreover, $\epsilon 2$ denotes the regulation of the second degree temperature coefficient y of t. The expression (154) is deformed into the following expression in accordance with the expression (160).

$$\{1+(\theta 3)t+(\theta 4)t^2\}/\{1+(\alpha a)t+(\alpha b)t\} = 1+y(1+\epsilon 2)t^2 \quad (154b)$$

In this case, if $\epsilon 2$ is equal to 0 independently of t, the expression (140) completely serves as a quadratic of t. However, $\epsilon 2$ is not equal to 0 in general. Therefore, when $|\epsilon 2| \leq 20\%$, it is very effective to use this circuit by practically regarding $\epsilon 2$ as a quadratic of t. In this case, the following expression is derived.

$$C2 = A2 + a(B2-A2)(1+yt^2) \quad (141b)$$

The expression (141b) includes some errors. However, the expression is simple, and thus it may be preferable to use the expression for rough calculation, while it may be preferable to use the expression (161) including $\epsilon 2$ for calculation of an accurate total error.

When substituting the values shown in the expression (150) or (151) for the expression (160) or (154b) and calculating $\epsilon 2$ by assuming t=ta-ts and ts=25° C., the following results are obtained.

TABLE 1

| Ambient temperature ta (° C.) | −85 | −45 | 0 | 45 | 105 | 125 |
|---|---|---|---|---|---|---|
| $\epsilon 2$ (%) | 13.5 | 3.1 | 0 | −2.9 | −10.8 | −130.2 |

In an ambient temperature range of −85° C. to +125° C., y fluctuates between 0% and ±14%. Therefore, when approximating the expression (140) to the expression (141b), it is necessary to handle y by assuming that y fluctuates between 0% and ±14%. However, even if y fluctuates as described above, when obtaining an output signal corresponding to the expression (5) by using the span-shift-temperature-coefficient second degree compensating circuit 47, it is possible to completely improve the total error compared to the case in which second degree compensation is not performed.

As described above, by combining the resistors 51, 52, and 53 having three types of temperature coefficients in the span-shift second degree temperature-coefficient-generating circuit 50 shown in FIG. 4, it is possible to constitute an operational circuit in which the temperature coefficient of a voltage amplification factor to a differential input voltage can be almost regarded as a quadratic.

To form the span-shift second degree temperature-coefficient-generating circuit 50 with an operational circuit having the transfer function shown by the expression (161), it is necessary to fix the voltage amplification factor a to 1 in the expression (161) at a reference temperature. Therefore, because 1+(R6+R7)/R5 is equal to 8/3 in the case of the above example, it is necessary to set the value of the variable resistor 5b or 4b so that Rg2/(Rg2+Rh2) or Ra2/(Ra2+Rb2) is equal to 3/8. In this case, the expression 141b) is deformed into the following expression.

$$C2 = A2 + (B2-A2)(1+yt^2) \quad (141c)$$

Moreover, when more accuracy is required for the expression (141b), the expression (141b) is deformed into the following expression.

$$C2 = A2 + (B2-A2)\{1+y(1+\epsilon 2)t^2\} \quad (161b)$$

The signal output voltage C2 of the span-shift second degree temperature-coefficient-generating circuit 50 is applied to the input terminal B3 or M3 of the second degree temperature-coefficient-adjusting circuit 55 or 33c. If y>0, used is a voltage output from the output terminal C3 of the second degree temperature-coefficient-adjusting circuit 55.

In the second degree temperature-coefficient-adjusting circuit 55, the expression (27) is used and B2=A3 and C2=B3=A2+(B2−A2)(1+yt$^2$) are applied to the input terminals A3 and B3. Therefore, the following expression is effectuated.

$$C3 = A3 + (D4b)(1 + R13/R12)(B3 - A3)$$
$$= B2 + (D4b)(1 + R13/R12)(B2 - A2)yt^2$$
$$(D4b) = Rg2/(Rg2 + Rh2)$$

Moreover, when A2=Vcc/2 is applied to the input terminal and θ1b of the expression (116a) is applied to B2 to set B2 to θ1b, the voltage at the output terminal C3 is shown by the following expression.

$$C3=Vcc-A(R21/R14)(1-\alpha^2t^2)\{1+(D4b)(1+R13/R12)yt^2\}P$$

In this case, when the slider of the variable resistor 5b is adjusted to change value of (D4b) so that (D4b)(1+R13/R12)y is equal to α$^2$, the above expression is deformed into the following expression.

$$C3 = Vcc/2 - A(R21/R14)(1 - \alpha^2t^2)(1 + \alpha^2t^2)P \quad (162)$$
$$= Vcc/2 - A(R21/R14)(1 - \alpha^4t^4)P$$

where t is equal to ta−ts.

Thus, it is possible to extract an output voltage corresponding to the expression (5) from the output terminal C3. For a strict calculation, the following expression (162b) is used.

$$C3b=Vcc/2-A(R21/R14)(1+\alpha t)\{1-\alpha(1+\epsilon)t\}\{1+\alpha^2(1+\epsilon 2)t^2\}P \quad (162b)$$

Moreover, in the case of y<0, that is, −y>0, an output voltage θ13 is obtained from the output terminal θ13 of the second degree temperature-coefficient-adjusting circuit 33c shown in FIG. 4 as described below.

The signal voltage C2 shown by the expression (114c) obtained from the span-shift second degree temperature-coefficient-generating circuit 50 is applied to the input terminal M3 of the second degree temperature-coefficient-adjusting circuit 33c. In this case, by using the expressions (25) and (26) and applying M3=C2=A2+(B2−A2)(1+yt$^2$) and N3=B2 to the input terminals M3 and N3, the following expressions are obtained.

$$\theta 13 = N3 + (D1b \cdot R11/R10)(N3 - M3)$$
$$= B2 + (D1b \cdot R11/R10)(B2 - A2)(-y)t^2$$
$$D1b = Rb2/\{Rb2 + Ra2(1 + Rb2/R10)\}$$

Moreover, by applying Vcc/2 to the input terminal A2 and θ1 in the expression (116a) to B2 to set A2 to Vcc/2 and B2 to θ1, the voltage θ13 shown by the following expression is obtained from the output terminal θ13.

$$\theta 13=Vcc/2-A(R21/R14)(1-\alpha^2t^2)\{1+(D1b)(R13/R12)(-y)t^2\}P$$

In this case, the slider of the variable resistor 4b is adjusted to change value of (D1b) so that (D1b)(1+R13/R12)(−y) is equal to α$^2$, the above expression is written into the following expression.

$$\theta 13 = Vcc/2 - A(R21/R14)(1 - \alpha^2t^2)(1 + \alpha^2t^2)P$$
$$= Vcc/2 - A(R21/R14)(1 - \alpha^4t^4)P$$

In the above expression, t is equal to ta−ts.

In this case, it is possible to obtain an output voltage corresponding to the expression (5) from the output terminal θ13. To execute a strict calculation, the following expression is used.

$$\theta 13b=Vcc/2-A(R21/R14)(1+\alpha t)\{1-\alpha(1+\epsilon)t\}\{1+\alpha^2(1+\epsilon 2)t^2\}P \quad (162c)$$

These expressions are the same as the expressions (162) and (162b).

Thus, either of output terminals of the second degree temperature-coefficient-adjusting circuits 55 and 33c is selected and used in accordance with the sign of y. As described above, an output voltage corresponding to the expression (117a) is obtained by applying the voltage shown in the expression (107) and Vcc/2 to the span-shift-temperature-coefficient first degree compensating circuit 45. Further an output voltage corresponding to the expression (162b) or (162c) is obtained by applying a voltage corresponding to the expression (117a) and Vcc/2 to the input terminals A2 and B2 of the span-shift-temperature-coefficient second degree compensating circuit 47. These output voltages are compensated with temperature, and serve as signal voltages approached to Z=Vcc/2−A(R21/R14)P when α is equal to 0.

When setting Vcc/2 to 0 in and removing DC components frog the expressions (107), (107b), (116b), (117a), (162) and (162b), expressions for effective components such as pressure and temperature are shown by the following expressions.

$$f=-A(R21/R14)P \quad (107c)$$
$$g=-A(R21/R14)(1+\alpha t)P \quad (107d)$$
$$h=-A(R21/R14)(1-\alpha^2t^2)P \quad (116d)$$
$$i=-A(R21/R14)(1+\alpha t)\{1-\alpha(1+\epsilon)t\}P \quad (117d)$$
$$j=-A(R21/R14)(1-\alpha^4t^4)P \quad (162e)$$
$$k=-A(R21/R14)(1+\alpha t)\{1-\alpha(1+\epsilon)t\}\{1+\alpha^2(1+\epsilon 2)t^2\}P \quad (162d)$$

As a true voltage for obtaining the expression (107c), relative errors included in the expressions (107d), (116d), (117d), (162) and (162d) are calculated. Percent (%) indications of relative errors η0, η11, η12, η21, and η22 are defined as shown below.

$$\eta 0\,(\%) = 100(g-f)/f = 100(+\alpha t) \quad (163)$$
$$\eta 11s\,(\%) = 100(h-f)/f = 100(-\alpha^2)(t^2)\ (\varepsilon=0) \quad (163b)$$
$$\eta 12s\,(\%) = \quad (163c)$$
$$100(i-f)/f = 100\{(1+\alpha t)\{1-\alpha(1+\varepsilon)t\}-1\}\ (\varepsilon \neq 0)$$
$$\eta 21s\,(\%) = 100(j-f)/f = 100(-\alpha^4t^4)(\varepsilon=\varepsilon 2=0) \quad (163e)$$

-continued $$\eta 22s (\%) = 100(k-f)/f \quad (163\text{f})$$
$$= 100\{(1+\alpha t)\{1-\alpha(1+\varepsilon)t\}\{1+\alpha^2(1+\varepsilon 2)t^2\} - 1\}$$

$\eta 22s(\%)$ shows the relative error of the whole present temperature-compensating circuit and serves as a target value of relative errors when the circuit is manufactured in an semiconductor-integrated-circuit.

These relative errors are calculated to confirm the effectiveness of the operational-circuit blocks 45 and 47. Deriving $\epsilon$ and $\epsilon 2$ from the expressions (87) and (154b), the following expressions are obtained.

$$\varepsilon = [\{\{1+(\theta 1)t+(\theta 2)t^2\}/\{1+(\alpha 1)t+(\alpha 2)t^2\}\} - 1]/(xt) - 1 \quad (165)$$

$$\varepsilon 2 = [\{\{1+(\theta 3)t+(\theta 4)t^2\}/\{1+(\alpha a)t+(\alpha b)t\}\} - 1]/(yt^2) - \quad (166)$$
$$1 \quad (x=0)$$

$$\varepsilon 2 = 1/\{1+(\alpha a)t+(\alpha b)t\}\} - 1] \quad (x=0) \quad (166\text{b})$$
$$t = ta - ts$$

The above calculation examples are used as constants. The following Table 2 shows results of calculating $\eta$ about to t by using $\alpha=3{,}000$ ppm/° C.($3 \times 10^{-3}$/° C.), ts=25° C., $\theta 1=1.87816 \times 10^{-3}$, $\theta 2=2.82471 \times 10^{-6}$, $\alpha 1=0.7 \times 10^{-3}$, $\alpha 2=2.0 \times 10^{-6}$, $x=1.178 \times 10^{-3}$, $\theta 3=1.5 \times 10^{-3}$, $\theta 4=2.39642 \times 10^{-6}$,

TABLE 2

| t (° C.) | −70 | −50 | −20 | 0 | 20 | 60 | 100 | 110 |
|---|---|---|---|---|---|---|---|---|
| ta (° C.) | −45 | −25 | 0 | 25 | 45 | 85 | 125 | 135 |
| η 0 (%) | −21 | −15 | −6 | 0 | 6 | 18 | 30 | 33 |
| η 11 s (%) | −4.41 | −2.25 | −0.36 | 0 | −0.36 | −3.24 | −9 | −10.9 |
| η 12 s (%) | −4.58 | −2.31 | −0.36 | 0 | −0.36 | −3.10 | −8.29 | −9.9 |
| η 21 s (%) | −0.19 | −0.05 | −0.001 | 0 | −0.001 | −0.105 | −0.81 | −1.19 |
| η 22 s (%) | 0.117 | 0.0591 | 0.005 | 0 | −0.006 | −0.215 | −1.12 | −1.52 |

$\alpha a = 1.5 \times 10^{-3}$,
$\alpha b = 0.2 \times 10^{-6}$, and
$y = 2.196 \times 10^{-6}$.

From the above, the relative error of $\eta 22$ is improved more than $\eta 12$. The relative error of $\eta 0=30\%$ at ta=125° C. is decreased to $\eta 12s$−8.296 and $\eta 22s$=−1.12% after passing through the span-shift first degree and second degree temperature-coefficient-compensating circuits. Thus, it is found that the relative error is completely improved. Moreover, at t=100° C., $\eta 22s(\%)$ is equal to −1.12 ($\epsilon \neq \epsilon 2 \neq 0$), while $\eta 21s(\%)$ is equal to 0.81 ($\epsilon = \epsilon 2 = 0$). Therefore, it is found that this compensating circuit is completely effective.

Second Embodiment.
(Another Configuration of Span-Shift First Degree-Temperature-Coefficient-Generating Circuit)

Figure 5A:
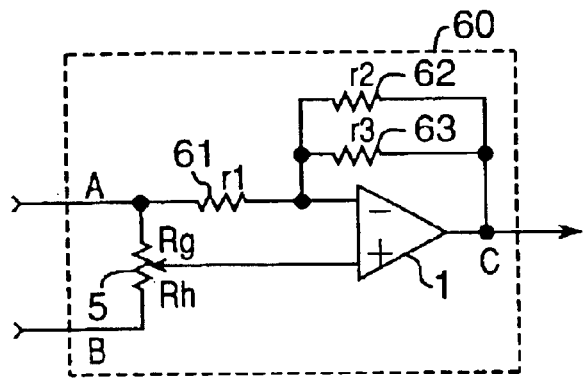
FIGS. 5A to 5C are circuit diagrams of a span-shift first degree temperature-coefficient-generating circuit in the second embodiment of the present invention.
Figure 5B:
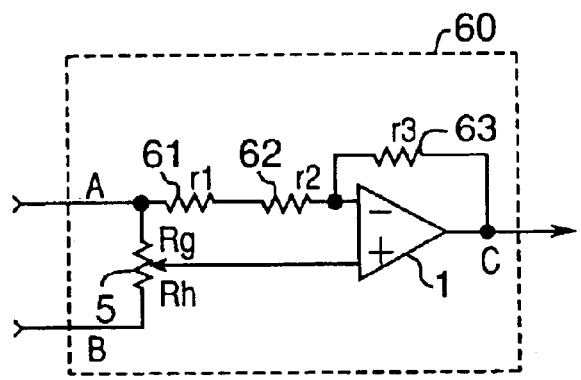
Figure 5C:
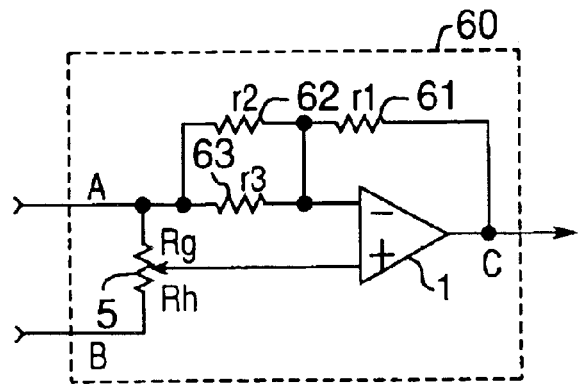

It is also possible to constitute a span-shift first degree temperature-coefficient-generating circuit by connecting resistors 61, 62, and 63 with an amplifier 1 as shown in FIGS. 5A to 5C.

In FIGS. 5A to 5C, a span-shift first degree temperature-coefficient-generating circuit 60 has an operational amplifier 1, a variable resistor 5, and resistors 61 to 63 as components. The operational amplifier 1 has the same characteristic as that shown in FIG. 14D2. The variable resistor 5 has resistances Rg and Rh between terminals of a slider and a resistor. The resistors 61, 62, and 63 have different first degree and second degree temperature coefficients. The resistor 61 corresponds to the resistor R12 shown in FIG. 14D2, and the resistors 62 and 63 which are connected in parallel correspond to R13.

When using resistors connected in parallel with each other, there are disadvantages that the necessary area of a semiconductor-integrated-circuit chip for forming resistors becomes greatly increased compared to the case of resistors connected in series, and that the linearity of a first degree temperature coefficient is deteriorated according to calculation. However, a temperature coefficient α is large compared to the case of connection in series. Moreover, the relative error of the whole circuit corresponding to the expression (149) is not bad.

The transfer function of the circuit shown in FIG. 5A is shown by the following expressions.

$$C=A+D4[1+(r2)(r3)/\{(r1)(r2+r3)\}]B-A) \quad (170)$$

$$D4=\{Rg/(Rg+Rh)\} \quad (171)$$

Forming Rg and Rh constituting the variable resistor 5 with the same type of resistors on the chip face of a semiconductor-integrated-circuit, allows temperature coefficients of those resistances to be equalized. It is possible for Rg/(Rg+Rh) to have a value independent of temperature. Moreover, r1, r2, and r3 can be shown by expressions (42), (43), and (44).

The following expression is obtained from the expressions (170), (42), (43), and (44).

$$1+(r2)(r3)/\{(r1)(r2+r3)\}=\{1+(Rf)/(R1)\}\{1+(\lambda 1)t+(\lambda 2)t^2+(\lambda 3)t^3+ \\ (\lambda 4)t^4\}/\{1+(\xi 1)t+(\xi 2)t^2+(\xi 3)t^3+(\xi 4)t^4\} \quad (172)$$

Then, a part of the expression (172) is developed into the following expression.

$$\{1+(\lambda 1)t+(\lambda 2)t^2+(\lambda 3)t^3+(\lambda 4)t^4\}/(\{1+(\xi 1)t+(\xi 2)t^2+(\xi 3)t^3+(\xi 4)t^4\}= \\ 1+xt+yt^2+zt^3+wt^4+at^5+\ldots \quad (174)$$

The coefficients are obtained from the following expressions.

$$(\kappa 1) = (\beta 1) + (\gamma 1), (\kappa 2) = (\beta 2) + (\beta 1)(\gamma 1) + (\gamma 2), \quad (175)$$
$$(\kappa 3) = (\beta 1)(\gamma 2) + (\gamma 1)(\beta 2), (\kappa 4) = (\beta 2)(\gamma 2),$$
$$(\delta 1) = \{(R2)(\beta 1) + (R3)(\gamma 1)\}/(R2+R3),$$
$$(\delta 2) = \{(R2)(\beta 2) + (R3)(\gamma 2)\}/(R2+R3),$$
$$(\xi 1) = (\alpha 1) + (\delta 1), (\xi 2) = (\alpha 2) + (\alpha 1)(\delta 1) + (\delta 2),$$
$$(\xi 3) = (\alpha 1)(\delta 2) + (\delta 1)(\alpha 2), (\xi 4) = (\alpha 2)(\delta 2),$$
$$(\lambda i) = \{(\xi i) + (\kappa i)(Rf)/(R1)\}/\{1+(Rf)/(R1)\},$$
$$(i = 1, 2, 3, 4)$$
$$(Rf) = \{(R2)(R3)\}/\{(R2)+(R3)\}$$

x, y, z, . . . denote first degree coefficient, second degree coefficient, third degree coefficient, . . . and they are negative real numbers.

The expression (170) can be deformed into the following expressions.

$$C = A + \{(Rg)/(Rg + Rh)\}\{1 + (Rf)/(R1)\} \quad (176)$$
$$(B - A)(1 + xt + yt^2 + zt^3 + \ldots)$$
$$= A + b(B - A)(1 + xt + yt^2 + zt^3 + \ldots)$$

$$b = \{(Rg)/(Rg + Rh)\}\{1 + (Rf)/(R1)\} \quad (177)$$

The expression (176) is the same as the expression (50).
Moreover, the following expressions are derived from the expression (174).

$$x = (\lambda 1) - (\xi 1) \quad (178)$$

$$y = (\lambda 2) - (\xi 2) - x(\xi 1) \quad (179)$$

$$z = -y(\xi 1) - x(\xi 2)$$
$$w = -z(\xi 1) - y(\xi 2) - x(\xi 3)$$
$$u = -w(\xi 1) - z(\xi 2) - y(\xi 3) - x(\xi 4)$$
$$v = -u(\xi 1) - w(\xi 2) - z(\xi 3) - y(\xi 4)$$

Substitution of the temperature coefficient shown by the expression (45), for example, for the above expressions provides x, y, z, . . .

The reason why three types of different first degree and second degree temperature coefficients are used for the resistors 61, 62, and 63 is to realize a transfer function in which voltage amplification factor of the operational amplifier 1 linearly changes about temperature t and thereby realize a necessary first degree temperature-coefficient-generating circuit, that is, to approximate the expression (176) to the following expression (180) as an input/output transfer function having only a first degree temperature coefficient about t at an ambient temperature ta in a range of −40° C. to +125° C.

$$C = A + b(B - A)(1 + xt + yt^2 + zt^3 + wt^4 \ldots) \quad (180)$$
$$\approx A + b(B - A)(1 + xt)$$

In the case of the expression (180), it is generally impossible to set a coefficient such as y=z=w . . . =0. However, by using resistors having three types (or two types) of temperature coefficients and setting values r2 and r3 of resistances 62 and 63 connected in parallel to decrease the influence of the value of $yt^2+zt^3+wt^4$ . . . in an operating temperature range and improve linearity, an expression having linearity close to the expression (180) is approximately obtained.

Approximation degrees of the expressions (176) and (180) are evaluated. For this reason, the expression (176) is deformed into the following expression (182).

$$C=A+b(B-A)[1+xt+\{1+(yt^2+zt^3+wt^4 \ldots)/(xt)\}] \quad (182)$$

Then, the regulation εp of the first degree coefficient x is set as shown below.

$$\varepsilon p = (yt^2 + zt^3 + wt^4 \ldots)/(xt) \quad (183)$$
$$= t(y + zt + wt^2 + ut^3 \ldots)/x$$

The expression (176) can be shown as the following expression. The expression (183) is the same type as the expression (63).

$$C=A+b(B-A)\{1+x(1+\varepsilon p)t\} \quad (176b)$$

If εp is equal to 0 independently of t, the expression (176b) is a complete linear expression about t. However, ε is not equal to 0 in general. Therefore, when approximately $|\varepsilon|\leq 5\%$ at the operating temperature, it is possible to regard the expression (176) as a linear expression about t for practical use. In this case, the following expression is derived.

$$C=A+b(B-A)(1+xt) \quad (176c)$$

The above expression is used to obtain or review an estimate, while the expression (176b) including εp is generally used to calculate an accurate total error. Moreover, Substituting the expression (183) for the expression (174) makes the expression (174) deformed into the following expression.

$$\{1+(\lambda 1)t+(\lambda 2)t^2+(\lambda 3)t^3+(\lambda 4)t^4\}/\{1+(\xi 1)t+(\xi 2)t^2(\xi 3)t^3+(\xi 4)t^4\}=1+xt(1+\varepsilon p) \quad (174b)$$

To improve linearity, a simplest method for obtaining R2 and R3 for minimizing $|\varepsilon|$ is described below. To set the reference temperature ts to a value of −20° C. to +30° C., in the expression (183), a high-order term for influencing linearity next to the first degree coefficient about t is the second degree coefficient about t in general. Therefore, the above method is a method for deciding R2 and R3 so as to set y to 0. However, though this method does not assure that $|\varepsilon|$ is the minimum value in an operating temperature range of −40° C. to +125° C., it is found from a calculation result that $|\varepsilon|$ is a comparatively small value in a wide temperature range.

To improve the linearity of the expression (70), prorated values of R2 and R3 for setting y which is the second degree coefficient about t in the expression (176) to zero are obtained.

In the expression (179), $$y=(k2)-(\xi 2)-x(\xi 1)=0 \quad (179b)$$

In this case, when k>1 and R3=k(Rf), the following expression (185) is obtained in accordance with the relation of 1/(R2)+1/(R3)=1/(Rf).

$$R2=\{k/(k-1)\}(Rf) \quad (185)$$

By substituting the expressions (185), (178), and (175) for the expression (179b) and rearranging the expression (179b), the following expression is derived.

$$[(\alpha 1)\{(\alpha 1)-(\gamma 1)\}-\{(\alpha 2)-(\gamma 2)\}]k^2-[\{(\beta 1)-(\gamma 1)\}\{(\beta 1)-(\gamma 1)\}-\{(\beta 2)-(\gamma 2)\}+(\alpha 1)\{(\beta 1)-(\gamma 1)\}]k+\{(\beta 1)-(\gamma 1)\}\{(\beta 1)-(\gamma 1)\}=0 \quad (186)$$

This serves as a quadratic equation about k. The expression (186) is solved for k, and then the resistance value Rf is determined based on k (k>1). It is possible to obtain R2 and R3 in accordance with the expression (185) by using the resistance value Rf.

By assuming Rf as 5 and R1 as 3 and using the temperature coefficient shown by the expression (45), calculated are resistance values R2 and R3 when the resistances 62 and 63 are connected in parallel, and the temperature coefficient and linearity of the input/output transfer function of the operational circuit block.

By obtaining k from the expressions (45) and (186) and selecting k which is larger than 1, K=1.440, R2=7.200, and R3=16.36 are obtained. Moreover, the following results are obtained from the expressions (175), (177) and so on.

$$\lambda1 = 6.250 \times 10^{-3}, \lambda2 = 17.96 \times 10^{-6}, \lambda3 = 17.29 \times 10^{-9}, \quad (186b)$$
$$\lambda4 = 5.063 \times 10^{-12}, \xi1 = 3.669 \times 10^{-3}, \xi2 = 8.494 \times 10^{-6},$$
$$\xi3 = 9.026 \times 10^{-9}, \xi4 = 8.834 \times 10^{-12}$$

$$x = 2.583 \times 10^{-3}, y = 0, z = -13.67 \times 10^{-9}, \quad (187)$$
$$w = 23.04 \times 10^{-12}, u = 8.806 \times 10^{-15}, v = -1.046 \times 10^{-16}.$$

Moreover, the linearity at ts=25° C. and ta=125° C. (t=100° C.) is shown by the following expression (188) in accordance with the expression (183).

$$\epsilon p = t(y + zt + wt^2 + ut^3 \ldots)/x = -4.4\% \quad (188)$$

Further, εp is equal to −2.9% at ta=85° C. (t=60° C.) and −3.8% at ta=−55° C. (t=−80° C.), and it becomes smaller than 5% at −55° C.≤t≤100° C.

As a result of comparing x and εp obtained from the expressions (187) and (188) with x and ε shown by the expressions (70) and (75) in the first embodiment, absolute values of them in the expressions (187) and (188) are larger than those in the expressions (70) and (75). It is preferable that |εp| is smaller. However, it may be possible to decrease a relative error by passing a sensor signal through a span-shift-temperature-coefficient second degree compensating circuit. Therefore, this parallel method can be also used.

By setting (Rg)/(Rg+Rh)=3/8, 1+(Rf)/(R1)=8/3, and b=1 in the expression (177), it is possible to replace the circuit 60 shown in FIG. 5A with the first degree temperature-coefficient-generating circuit 20b shown in FIG. 3.

A relative error η22p(%) corresponding to η22p(%) in the expression (163f) is obtained when the first degree temperature-coefficient-generating circuit 20b shown in FIG. 3 is replaced with the operational circuit block 60 shown in FIG. 5A. η22p(%) is shown as the following.

$$\eta 22p(\%) = 100(k - f)/f \quad (189)$$
$$= 100\{(1 + \alpha t)\{1 - \alpha(1 + \epsilon p)t\}\{1 + \alpha^2(1 + \epsilon 2)t^2 - 1\}$$

The expression (174b) is deformed to obtain εp.

$$\epsilon p = [\{1+(\lambda1)t+(\lambda2)t^2+(\lambda3)t^3+(\lambda4)t^4\}/\{1+(\xi1)t+(\xi2)t^2+(\xi3)t^3+(\xi4)t^4\}-1]/(xt)-1, t=ta-ts \quad (190)$$

The expression (178) is substituted for the expression (190) to provide the following expression.

$$\epsilon p[x+\{(\lambda2)-(\xi2)\}t+\{(\lambda3)-(\xi3)\}t^2+\{\{(\lambda4)-(\xi4)\}t^3]/[\{1+(\xi2)t^2+(\xi3)t^3+(\xi4)t^4\}x]-1, t=ta-ts \quad (190b)$$

η22p(%) is obtained from the above εp and ε2 shown by the expression (166b). In this case, by substituting ξ and λ shown in the expression (186) and x sown in the expression (187) for the expression (190b), η22p(%) about t is obtained as the following results, where α is equal to 3,000 ppm/° C. and ts is equal to 25° C.

As shown above, the relative accuracy η22p(%) has an accuracy equal to or higher than η22s(%) even under a parallel-connection state.

The circuit shown in FIG. 5B is described below.

When the circuit shown in FIG. 5B is used as a span-shift first degree temperature-coefficient-generating circuit, its transfer function is shown by the following expression.

$$C=A+D4\{1+(r1)/(r2+r3)\}(B-A), D4=\{Rg/(Rg+Rh)\}$$

The above expression can be processed in the same mathematical processing as in the case of the first embodiment. Therefore, it is possible to obtain values of R2 and R3 by using the expressions (42), (43), and (44). For example, when the second degree temperature coefficient y is equal to 0, the values are obtained in the following manner. That is, R2 is set to kR, R3 is set to (1−k)R, and R2+R3 is set to R to decide the voltage amplification factor R1/R at t=0. Then, the following quadratic equation is solved.

$$\{(\beta1)-(\gamma1)\}^2 k^2 - [(\beta2)-(\gamma2)+\{(\beta1)-(\gamma1)\}\{(\alpha1)-2(\gamma1)\}]k+(\alpha2)-(\gamma2)-(\gamma1)\{(\alpha1)-(\gamma1)\}=0$$

By solving the above expression and selecting k which satisfies 0<k<1, values of R2 and R3 are obtained.

The circuit shown in FIG. 5C is described below.

When using the circuit shown in FIG. 5C as a span-shift first degree temperature-coefficient-generating circuit, the transfer function of the circuit is shown by the following expression.

$$C=A+D4\{1+(r1)(r2+r3)/(r2)(r3)\}(B-A), D4=\{Rg/(Rg+Rh)\}$$

For the above expression, the same mathematical processing is useful as the process described for the circuit shown in FIG. 5A. That is, it is possible to obtain values of R2 and R3 from the expressions (42), (43) and (44). For example, when the second degree temperature coefficient y is equal to 0, the values are obtained as the follow nu. That is, to obtain values of R1, R2, and R3 so as to be y=0, a voltage amplification factor R1/Rf at t=0 is decided and the following expression is calculated by setting R3 to k(Rf) and R2 to {k/(k−1)}(Rf)

$$k=[(\gamma2)-(\beta2)+(\alpha1)\{(\gamma1)-(\beta1)\}+(\beta1)^2-(\gamma1)^2]/[(\gamma2)-(\alpha2)-(\gamma1)\{(\gamma1)-(\alpha1)\}]$$

k which satisfies k>1 is calculated from the above expression, and thus values of R2 and R3 are determined.
Third Embodiment.
(Another Configuration of Span-Shift Second Degree-Temperature-Coefficient-Generating Circuit)

Figure 6A:
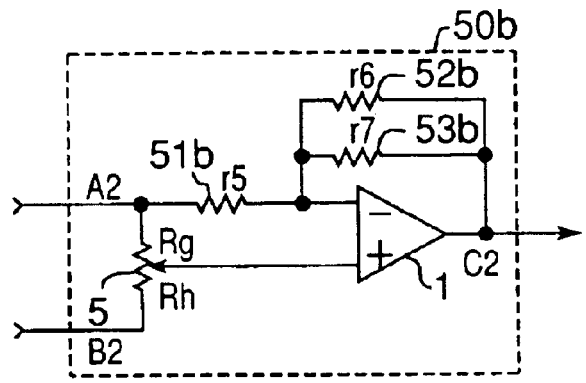
FIGS. 6A to 6C are circuit diagrams of a span-shift second degree temperature-coefficient-generating circuit in the third embodiment of the present invention.
Figure 6B:
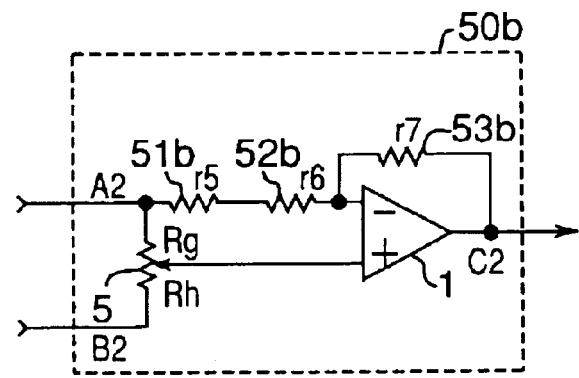
Figure 6C:
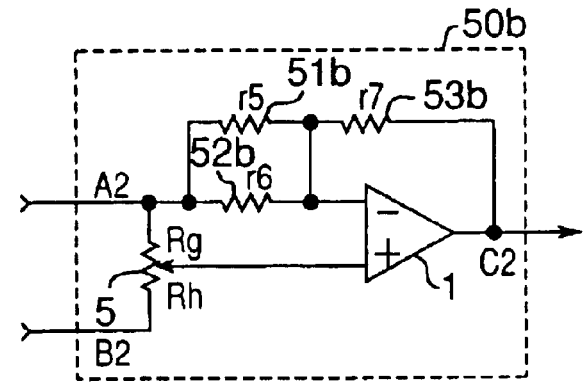

FIGS. 6A to 6C show another circuit configuration of the span-shift second degree temperature-coefficient-generating circuit 50.

In FIGS. 6A to 6C, resistors 51b, 52b and 53b have different first degree and second degree temperature coefficients. Resistances of those resistors 51b, 52b and 53b are r5, r6 and r7, respectively. The transfer function of the circuit 50b is obtained from the expression (27).

TABLE 3

| t (° C.) | −70 | −50 | −20 | 0 | 20 | 60 | 100 | 110 |
|---|---|---|---|---|---|---|---|---|
| ta (° C.) | −45 | −25 | 0 | 25 | 45 | 85 | 125 | 135 |
| η 22 p (%) | −0.2 | −0.06 | −0.003 | 0 | 0.001 | 0.008 | −0.041 | −0.074 |

The circuit shown in FIG. 6A is described below.

To distinguish the resistors 51*b*, 52*b* and 53*b* of the circuit shown in FIG. 6A from the resistances 51, 52 and 53 shown in FIG. 4, these resistance values are deformed as shown below.

$$r5 = R5p\{1+(\alpha a)t+(\alpha b)t^2\} \tag{200}$$

$$r6 = R6p\{1+(\beta a)t+(\beta b)t^2\} \tag{201}$$

$$r7 = R7p\{1+(\gamma a)t+(\gamma b)t^2\} \tag{202}$$

$$t = ta - ts$$

When resistors are connected in parallel, resistance of each resistor is larger than that of resistors connected in serial, and area required to form resistors are also larger. In general, series connection is more useful than the parallel connection, and it seems that it is less advantageous to apply parallel connection to a second degree temperature-coefficient-generating circuit. However, parallel connection is advantageous depending on the temperature coefficient of a resistor.

The expression (40) is changed as shown below in accordance with the circuit in FIG. 6A.

$$C2 = A + D4[1+(r6)(r7)/\{(r5)(r6+r7)\}](B2-A2) \tag{205}$$

$$D4 = \{Rg/(Rg+Rh)\} \tag{206}$$

When forming Rg and Rh constituting the variable resistor 5 by the same types of resistances on the chip ace of an integrated circuit, it is possible to equalize temperature coefficients. Rg/(Rg+Rh) has a value independent of temperature.

The term of $1+(r6)(r7)/\{(r5)(r6+r7)\}$ shown in the expression (205) can be deformed into the following expression (208) by using the expressions (200), (201), and (202).

$$1+(r6)(r7)/\{(r5)(r6+r7)\} = \{1+(Rfp)/(R5p)\}\{1+(\lambda 1)t+(\lambda 2)t^2+(\lambda 3)t^3+(\lambda 4)t^4\}/\{1+(\xi 1)t+(\xi 2)t^2+(\xi 3)t^3+(\xi 4)t^4\} \tag{208}$$

Moreover, $\{1+(\lambda 1)t+(\lambda 2)t^2+(\lambda 3)t^3+(\lambda 4)t^4\}/\{1+(\xi 1)t+(\xi 2)t^2+(\xi 3)t^3+(\xi 4)t^4\}$ is developed into a power series about t as shown below.

$$\{1+(\lambda 1)t+(\lambda 2)t^2+(\lambda 3)t^3+(\lambda 4)t^4\}/\{1+(\xi 1)t+(\xi 2)t^2+(\xi 3)t^3+(\xi 4)t^4\} = 1+xt+yt^2+zt^3+wt^4+at^5+\ldots \tag{209}$$

In this time, coefficients are obtained from the following expressions.

$$\begin{aligned}
&\kappa 1 = \beta a + \gamma a, \kappa 2 = (\beta b) + (\beta a)(\gamma a) + (\gamma b), \\
&\kappa 3 = (\beta a)(\gamma b) + (\gamma a)(\beta b), \kappa 4 = (\beta b)(\gamma b), \\
&\delta 1 = \{(R6p)(\beta a) + (R7p)(\gamma a)\}/(R6p + R7p), \\
&\delta 2 = \{(R6p)(\beta b) + (R7p)(\gamma b)\}/(R6p + R7p), \\
&\xi 1 = (\alpha a) + (\delta 1), \xi 2 = (\alpha b) + (\alpha a)(\delta 1) + (\delta 2), \\
&\xi 3 = (\alpha a)(\delta 2) + (\delta 1)(\alpha b), \xi 4 = (\alpha b)(\delta 2), \\
&\lambda i = \{(\xi i) + (\kappa i)(Rfp)/(R5p)\}/\{1 + (Rfp)/(R5p)\} \\
&\quad (i = 1, 2, 3, 4), \\
&Rfp = \{(R6p)(R7p)\}/\{(R6p) + (R7p)\}
\end{aligned} \tag{210}$$

Moreover, x, y, z, . . . denote first degree coefficient, second degree coefficient, third degree coefficient, . . . and are real numbers.

The expression (205) can be shown as the following expressions.

$$C2 = A2 + \{(Rg)/(Rg+Rh)\}\{1 + (Rfp)/(R5p)\}(B2-A2) \tag{212}$$
$$(1+xt+yt^2+zt^3+\ldots)$$
$$= A2 + b(B2-A2)(1+xt+yt^2+zt^3+\ldots)$$

$$b = \{(Rg)/(Rg+Rh)\}\{1+(Rfp)/(R5p)\} \tag{213}$$

Furthermore, the following relations are obtained from the expression (209).

$$x = (\lambda 1) - (\xi 1) \tag{215}$$

$$\begin{aligned}
y &= (\lambda 2) - (\xi 2) - x(\xi 1) \\
z &= -y(\xi 1) - x(\xi 2) \\
w &= -z(\xi 1) - y(\xi 2) - x(\xi 3) \\
u &= -w(\xi 1) - z(\xi 2) - y(\xi 3) - x(\xi 4) \\
v &= -u(\xi 1) - w(\xi 2) - z(\xi 3) - y(\xi 4)
\end{aligned} \tag{216}$$

Because the above relations are effectuated, x, y, z, . . . are obtained by substituting the temperature coefficient shown by the expression (45) for these, expressions.

As described for the first embodiment, an input/output transfer function in which a temperature coefficient has only a second or higher degree term is obtained from the expression (212) by setting x to 0.

$$C2 = A2 + b(B2-A2)(1+yt^2+zt^3+wt^4\ldots) \tag{218}$$

$$b = \{(Rg)/(Rg+Rh)\}\{1+(Rfp)/(R5p)\}, t = ta-ts$$

The expression (212) is means for providing a second or higher degree temperature coefficient about t and approaching as close to the following expression (219) as possible in an ambient temperature range of −40° C. to +125° C.

$$C2 \approx A2 + b(B2-A2)(1+yt^2) \tag{219}$$

To approximate a value obtained from the expression (218) to a value obtained from the expression (219), x=0 is a prerequisite. $(1+yt^2)$ denotes a temperature coefficient term of the voltage amplification factor b.

As shown in the expression (218), resistance values R5*p*, R6*p* and R7*p* which provide x=0 are obtained as described below. By setting x=$(\lambda 1)-(\xi 1)$=0 in the expression (215), substituting the expression (210) for the expression (215) to rearranging the expression, the following expression (222) is obtained.

$$R6p/R7p = (\alpha a - \beta a)/(\gamma a - \alpha a) \tag{222}$$

$$R6p = (k)Rfp, R7p = \{k/(k-1)\}Rfp, \tag{223}$$
$$1/(R6p) + 1/(R7p) = 1/(Rfp)(Constant)$$

k which satisfies the above expressions is determined. k is obtained from the expressions (223) and (222).

$$k = (\gamma - a - \beta a)/(\gamma a - \alpha a) \tag{225}$$

Resistance values R6*p* and R7*p* are obtained from the above k and the expression (223). In this case, the following relation (226) is needed to keep k>1.

$$\gamma a > \alpha a > \beta a \text{ or } \gamma a < \alpha a < \beta a \tag{226}$$

Moreover, $\epsilon 2p$ corresponding to the expression (166b) is obtained from the following expression.

$$\epsilon 2p=\{[(\lambda 2)-(\xi 2)+\{(\lambda 3)-(\xi 3)\}t+\{(\lambda 4)-(\xi 4)\}t^2]/[\{(\lambda 2)-(\xi 2)\}\{1+(\xi 1)t+(\xi 2)t^2+(\xi 3)t^3+(\xi 4)t^4\}]\}-1 \quad (227)$$

The temperature coefficient of a resistor, and Rfp and R5p for deciding a voltage amplification factor at t=0 is determined. Then, from these values and k, values of R6p and R7p are obtained. Same calculation as the case of the first embodiment except the above mentioned is performed.

The circuit shown in FIG. 6B is described below.

The transfer function of the span-shift second degree temperature-coefficient-generating circuit shown in FIG. 6B is shown by the following expressions.

$$C2=A2+D4\{1+(r7)/(r5+r6)\}(B2-A2)$$

$$D4=\{Rg/(Rg+Rh)\}$$

The above expressions can be processed in accordance with the same mathematical method as the case of the first embodiment.

When the first degree temperature coefficient x is equal to 0, the following process is performed.

With R5=kR, R6=(1−k)R and R5+R6=R, a voltage amplification factor R7/R at t=0 is decided to calculate the following expression. It is noted that the following expression corresponds to the expression (146) in the first embodiment.

$$k=\{(\alpha a)-(\gamma a)\}/\{(\beta a)-(\gamma a)\}$$

By solving the above expression to obtain k satisfying 0<k<1, R5 and R6 are calculated.

The circuit shown in FIG. 6C is described below.

The transfer function of the span-shift second degree temperature-coefficient-generating circuit shown in FIG. 6C is shown by the following expressions.

$$C2=A2+D4\{1+(r7)(r5+r6)/(r5)(r6)\}(B2-A2)$$

$$D4=\{Rg/(Rg+Rh)\}$$

The above expressions can be processed in accordance with the same mathematical process as in the case of FIG. 6A. R5p and R6p are obtained from the expressions (200), (201), and (202). For example, when the second degree temperature coefficient y is equal to 0, the following process is performed.

With R5p=k(Rfp) and R6p={k/(k−1)}(Rfp), and a voltage amplification factor R7/Rfp at t=0 is obtained, and then the following expression is calculated. The following expression corresponds to the expression (225).

$$k=\{(\gamma a)-(\beta a)\}/\{(\gamma a)-(\alpha a)\}$$

By obtaining k satisfying k>1 from the above expression, R5p and R6p are obtained.

Fourth Embodiment.
(Span-Shift-Temperature-Coefficient-Generating Circuit Including Resistors Having Two Different Types of Temperature Coefficients)

In the case of the above embodiments, three types of resistors each of which has a different temperature coefficient are connected to one amplifier to realize first degree and second degree temperature-coefficient-generating circuits. However, by combining resistors having two different types of first degree and second degree temperature coefficients without making temperature coefficients of three types of resistors different, a temperature-coefficient-generating circuit can be realized similarly to the case of three types of resistors. When two types of resistances are used, the error between resistors decreases more than the case of using three types of resistances, and deterioration of an electrical characteristic due to fluctuation under fabrication is decreased.

Figure 7A:
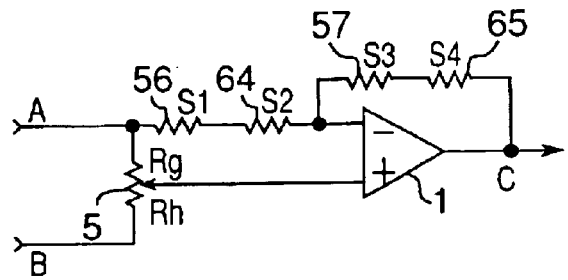
FIGS. 7A to 7D are illustrations showing another configurations of a span-shift first degree temperature-coefficient-generating circuit and a span-shift second degree temperature-coefficient-generating circuit in the forth embodiment of the present invention.
Figure 7B:
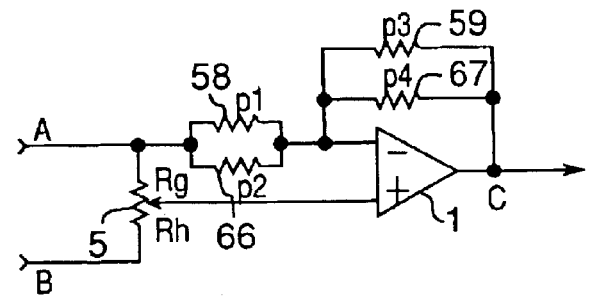
Figure 7C:
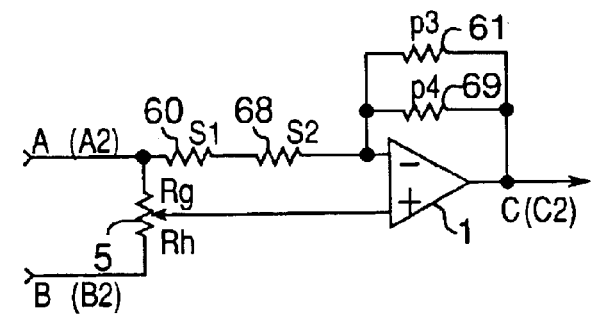
Figure 7D:
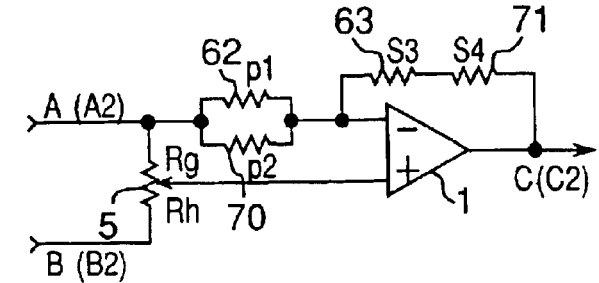

FIGS. 7A and 7D show configurations of first degree temperature-coefficient-generating circuits using resistors of two types of temperature coefficients and FIGS. 7B and 7C show configurations of span-shift second degree temperature-coefficient-generating circuits using two types of resistors of two types of temperature coefficients.

In FIG. 7A, resistors 56 and 57 having resistance values s1 and s3 are formed with the same type. Moreover, resistors 64 and 65 having resistance values s2 and s4 are formed with the same type. The type of resistances which form the resistors 56 and 57 is different from the type of resistances which form the resistors 64 and 65. Same types of resistors have the same first degree and second degree temperature coefficients.

In FIG. 7B, resistors 58 and 59 having resistance values of p1 and p3 are formed with the same type. Resistors 66 and 67 having resistance values p2 and p4 are formed with the same type. The type of resistances which form the resistors 58 and 59 is different from the type of resistances which form the resistors 66 and 67.

In FIG. 7C, resistors 60 and 61 having resistance values s1 and p3 are formed with the same type. Resistors 68 and 69 having resistance values s2 and p4 are formed with the same type. The type of resistances which form the resistors 60 and 61 is different from the type of resistances which form the resistors 68 and 69.

In FIG. 7D, resistors 62 and 63 having resistance values p1 and s3 are formed with the same type. Resistors 70 and 71 having resistance values p2 and s4 are formed with the same type. The type of resistances which form the resistors 62 and 63 is different from the type of resistances which form the resistors 70 and 71.

β1 and γ1 are taken as the first degree temperature coefficients and β2 and γ2 are taken as the second degree temperature coefficients, and then resistance values of resistors are shown by the following expressions. ta and ts are under the same conditions as those previously described.

$$s1=e(S5)\{1+(\beta 1)t+(\beta 2)t^2\} \quad (230a)$$

$$s2=(1-e)(S5)\{1+(\gamma 1)t+(\gamma 2)t^2\} \quad (230b)$$

$$s3=f(S6)\{1+(\beta 1)t+(\beta 2)t^2 \quad (230c)$$

$$s4=(1-f)(S6)\{1+(\gamma 1)t+(\gamma 2)t^2\} \quad (230d)$$

$$p1=k(P5)\{1+(\beta 1)t+(\beta 2)t^2\} \quad (230e)$$

$$p2=\{k/(k-1)\}(P5)\{1+(\gamma 1)t+(\gamma 2)t^2\} \quad (230f)$$

$$p3=m(P6)\{1+(\gamma 1)t+(\gamma 2)t^2\} \quad (230g)$$

$$p4=\{m/(m-1)\}(P6)1+(\gamma 1)t+(\gamma 2)t^2\} \quad (230h)$$

Therefore, for given resistance values S5, S6, P5, and P6 under conditions of 0≦e≦1, 0≦f≦1, k≧1 and m≧1 at a reference temperature t=0, s1, s2, s3, s4, p1, p2, p3, and p4 are obtained as follows;

$$s1=e(S5), s2=(1-e)(S5), s3=f(S6), s4=(1-f)(s6), p1=k(P5), p2=\{k/(k-1)\}(P5), p3=m(P6), p4=\{m/(m-1)\}(P6) \quad (231).$$

Resistance values according to the expressions (231) serve as reference values for designing resistors at the reference temperature t=0.

Moreover, at t=0, s1+s2 is equal to S5 and s3+s4 is equal to S6 in accordance with the above expressions. Therefore, S5 and S6 respectively show a combined resistance value of series resistances. Further, since 1(p1)+1/(p2) is equal to 1/(P5) and 1/(p3)+1/(p4) is equal to 1/(P6), P5 and P6 respectively show a combined resistance value of parallel resistances.

Change of given S5, S6, P5, P6, e, f, k, and m can modify linearity of voltage amplification factors of first degree temperature-coefficient-generating circuits shown in FIGS. 7A to 7D.

In the circuit diagrams shown in FIGS. 7A to 7D, the resistances 56 and 64 and the resistances 57 and 54 are connected in series and the resistances 58 and 66 and the resistances 59 and 67 are connected in parallel. For example, the equivalent resistance of s1 and s2 is obtained from the following expression.

$$s1+s2 = e(S5)\{1+(\beta 1)t+(\beta 2)t^2\}+(1-e)(S5)\{1+ \qquad (235)$$
$$(\gamma 1)t+(\gamma 2)t^2\}$$
$$=(S5)\{1+(\alpha 1)t+(\alpha 2)t^2\}$$

$$\text{where } \alpha 1 = (\beta 1)e+(\gamma 1)(1-e), \alpha 2 = (\beta 2)e+(\gamma 2)(1-e). \qquad (236)$$

α1 and α2 serve as first degree and second degree temperature coefficients of the equivalent series resistance S5. By deciding S5 and e, it is possible to obtain the temperature coefficient of the equivalent series resistance.

To obtain the input/output transfer function of the circuit shown in FIG. 7A, the expression (40) is used and thereby, the following expression is obtained.

$$C = A + D4\{1+(s3+s4)/(s1+s2)\}(B-A) \qquad (238)$$

The expression (238) is an expression obtained by replacing r2+r3 with s3+s4 and r1 with s1+s2 in the expression (40). In this case, the expression (236) is applied to α1 and α2.

Substituting the expressions (230a) to (230d) for D4{1+(s3+s4)/(s1+s2)} and performing a deformation corresponding to the expressions from (45) to (49), the expression (238) is expressed as follows.

$$C = A + d(B-A)\{1+(\theta 1)t+(\theta 2)t^2\}/\{1+(\alpha 1)t+(\alpha 2)t^2\} \qquad (239)$$
$$= A + d(B-A)(1+xt+yt^2+zt^3+wt^4+\ldots) \qquad (240)$$
$$d = \{Rg/(Rg+Rh)\}\{1+(S6)/(S5)\} \qquad (241)$$

In the above expressions, x and y denote first degree and second degree temperature coefficients of t and they are shown as follows:

$$x = \{(\beta 1)-(\gamma 1)\}(f-e)/(1+(S5)/(S6)) \qquad (242)$$

$$y = [\{(\beta 2)-(\gamma 2)\}-[e\{(\beta 1)-(\gamma 1)\}+(\gamma 1)\{(\beta 1)-(\gamma 1)\}] \qquad (243)$$
$$(f-e)/(1+(S5)/(S6))$$

Moreover, the circuit in FIG. 7A is used by setting d to 1 in the expression (241). This is because an expression corresponding to the expression (141c) is obtained. However, as described later, even if a is set to 2 and d is set to 2, it is possible to use the circuit in FIG. 7A as a first degree temperature-coefficient-generating circuit by modifying post-stage circuits.

When applying the circuit in FIG. 7A to the first degree temperature-coefficient-generating circuit, it needs to decide a combination of resistors respectively capable of reducing the influence of a second degree temperature coefficient and improving the linearity of a first degree temperature coefficient by deciding values of e and f so that y is equal to 0, similarly to the case shown by the expression (71). Therefore, it is necessary to meet the following relation in accordance with the expression (243).

$$(f-e)=0, \text{ or}$$

$$\{(\beta 2)-(\gamma 2)\}-[e\{(\beta 1)-(\gamma 1)\}+(\gamma 1)]\{(\beta 1)-(\gamma 1)\}=0 \qquad (245)$$

In this case, by setting e−f to 0, $\{1+(\theta 1)t+(\theta 2)t^{21}/\{1+(\alpha 1)t+(\alpha 2)t^2\}=1$ is obtained in the expression (239), and thus the temperature coefficient term cannot be applied because it disappears. Therefore the following expression is obtained from the expression (245).

$$e=[\{(\beta 2)-(\gamma 2)\}/\{(\gamma 1)-(\gamma 1)\}-(\beta 1)]/\{(\beta 1)-(\gamma 1)\} \qquad (247)$$

Using e from the above expression, f can have any value in a range of 0<f<1. In this case, when changing e by about ±15%, linearity may be improved depending on an operating temperature range.

Moreover, to realize a span-shift second degree temperature-coefficient-generating circuit by the circuit shown in FIG. 7A, it is necessary to set x to 0 in the expression (242). That is, $\{(\beta 1)-(\gamma 1)\}(f-e)$ must be equal to 0 and (f−e) or $\{(\beta 1)-(\gamma 1)\}$ must be equal to 0. When (f−e)=0, $\{1+(\theta 1)t+(\theta 2)t^2\}/\{1+(\alpha 1)t+(\alpha 2)t^2\}$ becomes equal to 1 and thus the temperature coefficient term cannot be applied because it disappears. Moreover, since the temperature coefficient β1−γ1 of a resistor is not equal to 0 in general, this circuit can not form the span-shift second degree temperature-coefficient-generating circuit.

When using the expression (40) to obtain the input/output transfer function of the circuit shown in FIG. 7B, the following expressions are obtained.

$$C=A+D4[1+(p3)(p4)(p1+p2)/((p3+p4)(p1)(p2)1](B-A) \qquad (250)$$
$$D4=Rg/(Rg+Rh)$$

The expression (250) is derived from the expression (40) in which r2+r3 is replaced with (p3)(p4)/(p3+p4) and r1 with (p1)(p2)/(p1+p2).

Substituting the expressions (230e) to (230h) for D4[1+(p3)(p4)(p1+p2)/{(p3+p4)(p1)(p2)}] and executing the deformation corresponding to the expressions from (45) to (49), the expression (250) is deformed as shown below as an expression corresponding to the expression (50)

$$C=A+D4[1+(p6)/(p5)](B-A)\{1+(\delta 1)t+ \qquad (252)$$
$$(\delta 2)t^2\}/\{1+(\kappa 1)t+(\kappa 2)+t^2\}$$
$$=A+(d2)(B-A)(1+xt+yt^2zt^3+wt^4+\ldots) \qquad (254)$$
$$d2=\{Rg/(Rg+Rh)\{1+(P6)/(P5)\} \qquad (256)$$

In the above expression, (δ1), (δ2), (κ1), and (κ2) denote constants corresponding to temperature coefficients. Moreover, x and y denote first degree and second degree temperature coefficients about t, which are shown as follows.

$$x = \{(\beta 1)-(\gamma 1)\}(k-m)/\{(km)(1+P5/P6)\} \qquad (257)$$

$$y = [(\beta 2)-(\gamma 2)-\{(\beta 1)m-(\beta 1)+(\gamma 1)\}(\beta 1)-(\gamma 1)\}/m] \qquad (258)$$
$$(k-m)/\{(km)(1+P5/P6)\}$$

Moreover, the circuit in FIG. 7B is used by setting d2 to 1 in the expression (256) in order to obtain an expression corresponding to the expression (141c) by setting a to 1 in the expression (141b) However, as described later, by modifying rear-stage circuits even if d2 is set to 2, it is possible to use the circuit in FIG. 7B as a first degree temperature-coefficient-generating circuit.

When applying the above expressions to realize a first degree temperature-coefficient-generating circuit according to the circuit shown in FIG. 7B, it is necessary to decide a combination of resistors capable of decreasing the influence of the second degree temperature coefficient of a voltage amplification factor and improving the linearity of a first degree temperature coefficient by deciding k and m so that y is equal to 0, as same as the case shown by the expression (71). The following expression is obtained from the expression (242).

$$(k-m)=0 \text{ or}$$

$$[(\beta 2)-(\gamma 2)-\{(\beta 1)+(\gamma 1)\}\{(\beta 1)-(\gamma 1)\}/m]=0 \qquad (259)$$

When setting k−m to 0, $(1+(\delta 1)t+(\delta 2)t^2)/\{1+(\kappa 1)t+(\kappa 2)t^2\}$ becomes equal to 1 in the expression (239), and thus the temperature coefficient term cannot be applied because it disappears. The following expression (260) is obtained from the expression (259).

$$m=\{(\beta 1)-(\gamma 1)\}\{(\beta 1)-(\gamma 1)\}/[(\beta 1)\{(\beta 1)-(\gamma 1)\}-\{(\beta 2)-(\gamma 2)\}] \qquad (260)$$

With m according to the above expression, k can be determined so that k is larger than 1. Change of value of m by about ±15%, linearity may be improved depending on an operating temperature range.

Moreover, to realize a second degree temperature-coefficient-generating circuit in accordance with FIG. 7B, it is necessary to set x to 0 in the expression (257). That is, $(\beta 1)-(\gamma 1)\}(k-m)$ must be equal to 0 and (k−m) or $\{(\beta 1)-(\gamma 1)\}$ must be equal to 0. When (k−m) is equal to 0, $\{1+(\delta 1)t+(\delta 2)t^2\}/\{1+(\kappa 1)t+(\kappa 2)t^2\}$ becomes equal to 1, and thus the temperature coefficient term cannot be applied because it disappears. Since the temperature coefficient $(\beta 1)-(\gamma 1)$ of a resistor is not equal to 0 in general, this circuit can not be used as a span-shift second degree temperature-coefficient-generating circuit.

The circuit shown in FIG. 7C or 7D can be used as a first degree or second degree temperature-coefficient-generating circuit. However, as to the first degree temperature-coefficient-generating circuit according to the circuit diagram shown in FIG. 7C or 7D, a resistance value at a reference temperature often tends to become negative in the calculation of a combination of resistors which can improve the linearity of a voltage amplification factor, depending on the temperature coefficient of a resistor. The first degree temperature-coefficient-generating circuit can be realized in accordance with the circuit diagram shown in FIG. 7A or 7B, while the second degree temperature-coefficient-generating circuit has to be realized by the circuit shown in FIG. 7C or 7D.

The transfer function of the circuit shown in FIG. 7c is shown by the following expression.

$$C=A+D4[1+(p3)(p4)/\{(p3+p4)(s1+s2)\}](B-A) \qquad (265)$$

The expression (265) is an expression obtained by replacing (r2)(r3)/(r2+r3) with (p3)(p4)/(p3+p4) and r1 with (s1+s2) in the expression (170).

By substituting the expressions (230a), (230b), (230g) and (230h) for $D4[1+(p3)(p4)/\{(p3+p4)(s1+s2)\}]$ and executing the deformation corresponding to the expressions from (172) to (177), the expression (265) is deformed as shown below as an expression corresponding to the expression (176).

$$C = A + (d3)(B - A)\{1 + (\lambda 1)t + (\lambda 2)t^2 + (\lambda 3)t^3 + (\lambda 4)t^4\}/ \qquad (267)$$
$$\{1 + (\xi 1)t + (\xi 2)t^2 + (\xi 3)t^3 + (\xi 4)t^4\}$$

$$= A + (d3)(B - A)\{1 + xt + yt^2 + zt^3 + wt^4 + \ldots\} \qquad (268)$$

$$d3 = \{Rg/(Rg + Rh)\{1 + (P6)/(S5)\} \qquad (269)$$

where $(\lambda 1)$ to $(\lambda 4)$ and $(\xi 1)$ to $(\xi 4)$ denote constants corresponding to temperature coefficients. x and y denote first degree and second degree temperature coefficients about, respectively. The circuit shown in FIG. 7C is used by setting d3 to 1 in the expression (269). This is because an expression corresponding to the expression (141c) is obtained by setting a to 1 in the expression (141b). Further, the circuit shown ill FIG. 7C can be used as a temperature-coefficient-generating circuit by setting d3 to 2 and modifying post-stage circuits as described later.

When applying the circuit shown in FIG. 7C to a first degree temperature-coefficient-generating circuit, it is necessary to decide a combination of resistors which can reduce the influence of the second degree temperature coefficient of a voltage amplification factor and improve the linearity of a first degree temperature coefficient by deciding k and m so that y is equal to 0, as shown in the expression (179b). To set y to 0 in the series development about t shown in the expression (268), $(\lambda 2)-(\xi 2)$ is set to 0 in accordance with the expression (179). This corresponds to the expression (186). In this case, the expression (186) is shown by the following quadratic equation (186) about m.

$$[(\alpha 1)\{(\alpha 1)-(\gamma 1)\}-[(\alpha 2)-(\gamma 2)\}]m^2-[\{(\beta 1)-(\gamma 1)\}\{(\beta 1)-(\gamma 1)\}-\{(\beta 1)-(\gamma 2)\}+(\alpha 1)\{(\beta 1)-(\gamma 1)\}]m+$$
$$\{(\beta 1)-(\gamma 1)\}\{(\beta 1)-(\gamma 1)\}=0 \qquad (186)$$

where $\alpha 1$ is equal to $e\{(\beta 1)-(\gamma 1)\}+(\gamma 1)$, and $\alpha 2$ is equal to $e\{(\beta 2)-(\gamma 2)\}+(\gamma 2)$.

When solving the expression (186) for k, reference resistance values of resistance values p3 and p4 at t=0 are obtained from m(P6) and p4={m/(m−1)} P6 by using m which is equal to or larger than 1. Reference resistance values of s1 and s2 are obtained from e(S5) and (1−e) (S5) by deciding e which satisfies 0<e<1. When changing values of m and e obtained from the above expressions by about ±15%, it may be possible to set values of k and e for further improving linearity.

The circuit shown in FIG. 7C can be applied to a span-shift second degree temperature-coefficient-generating circuit by deciding k and m so as to be x=0, as shown by the expression (179b). To set x to 0 in the series development about t shown in the expression (268), $(\lambda 1)-(\xi 1)$ is set to 0 in accordance with the expression (178). For meeting this expression, it is enough that $(em-1)\{(\gamma 1)-(\beta 1)\}$ is equal to 0.

$$(em-1)=0 \text{ or } \{(\gamma 1)-(\beta 1)\}=0 \qquad (271)$$

Therefore, by properly deciding m and e which meet m>1, 0<e<1 and e=1/m, reference resistance values of the resistance values p3 and p4 at t=0 are obtained from m(P6) and p4=(m/(m−1))P6.

Reference resistance values of s1 and s2 is obtained from e(S5) and (1−e)(S5). In this case, the reference resistance values can be used for the span-shift second degree temperature-coefficient-generating circuit 50 shown in FIG. 3. However, as to another condition $\{(\gamma 1)-(\beta 1)\}=0$, the temperature coefficient (β1)–(γ1) of a resistor is not equal to 0 in general. Therefore, it is impossible to realize a second degree temperature-coefficient-generating circuit in accordance with the above condition. When changing m and e thus obtained by about ±15%, it may be possible to set a high-accuracy circuit-device value having less relative errors in an operating temperature range.

The input/output transfer function of the circuit shown in FIG. 7D is shown by the following expression.

$$C=A+D4[1+(s6)(p1+p2)/\{(p1)(p2)\}](B-A) \quad (275)$$

The expression (275) is an expression obtained by replacing (r2)(r3)/(r2+r3) with (s3)+(s4) and r1 with (p1)(p2)/(p1)+(p2) in the expression (170).

By substituting the expressions (230c), (230d), (230e), and (230f) for D4[1+(s6)(p1+p2)/{(p1)(p2)}] and executing the deformation corresponding to the expressions from (172) to (177), the expression (265) is shown by the following expression as an expression corresponding to the expression (176).

$$C - A + (d4)(B - A)\{1 + (\lambda 5)t + (\lambda 6)t^2 + (\lambda 7)t^3 + (\lambda 8)t^4\}/ \quad (275b)$$
$$\{1 + (\xi 5)t + (\xi 6)t^2 + (\xi 7)t^3 + (\xi 8)t^4\}$$

$$= A + (d4)(B - A)\{1 + xt + yt^2 + zt^3 + wt^4 + ...\} \quad (276)$$

$$d4 = \{Rg/(Rg + Rh)\}\{1 + (S6)/(P5)\} \quad (277)$$

where (275b), (λ5) to (λ8) and (ξ5) to (ξ6) denote constants corresponding to temperature coefficients. x and y denote first degree and second degree temperature coefficients about t, respectively.

The circuit sown in FIG. 7D is used by setting d4 to 1 in the expression (277). However, as described later, even if d4 is set to 2, the circuit shown in FIG. 7D can used as a temperature-coefficient-generating circuit by modifying circuits on rear-stages.

In case that the circuit shown in FIG. 7D is applied to a first degree temperature-coefficient-generating circuit, it is necessary to combine resistors capable of reducing the influence of the second degree temperature coefficient of a voltage amplification factor and improving the linearity of a first degree temperature coefficient by deciding k and m so as to be y=0, as shown in the expression (179b). To set y to 0 in the series development about t shown in the expression (268), the following expression (279) is derived by referring to the expression (179).

$$(\lambda 6)-(\xi 6)-x(\xi 5)=0 \quad (279)$$

The following expression is obtained from the expression (279).

$$k=1+(1-1/f)[(\beta 1)\{(\beta 1)-(\gamma 1)\}-\{(\beta 2)-(\gamma 2)\}]/[\{(\beta 2)-(\gamma 2)\}-(\gamma 1)\{(\beta 1)-(\gamma 1)\}] \quad (280)$$

By meeting the expression (280) and deciding f (0<f<1) and k(k>1), reference resistance values of resistance values s3, s4, p3, and p4 at t=0 are obtained from f(S6), (1−f)(S6), p3=kP5, and p4={k/(k−1)}P5, respectively. When changing f and k which are obtained from the expression (280) by about ±15%, it may be possible to set values of k and f for further improving linearity in an operating temperature range.

The circuit in FIG. 7D can be applied to a second degree temperature-coefficient-generating circuit by deciding k and f for meeting x=0 as the example shown by the expression (178) In the series development about t shown in the expression (276), (λ5)–(ξ5) is set to 0 in the expression (276) to set x to 0 by referring to the expression (178). To meet the expression, it is enough that (kf−1){(β1)–(γ1) is equal to 0. Therefore, it is enough to meet the following expression.

$$(kf-1)=0 \text{ or}$$
$$\{(\beta 1)-(\gamma 1)\}=0 \quad (282)$$

By deciding k (k>1) and f (0<f<1) which meet k=1/f, reference resistance values of resistance values s3, s4, p3, and p4 are obtained from f(S6), (1−f) (S6), p3=kP5 and p4={k/(k−1)}P5, respectively. In this case, this circuit can be used as the span-shift second degree temperature-coefficient-generating circuit 50 shown in FIG. 4. However, as to another condition {(γ1)–(β1)}=0, the temperature coefficient (β1)–(γ1) of a resistor is not equal to 0 in general. Therefore, it is impossible to realize a span-shift second degree temperature-coefficient-generating circuit according to the above condition.

By using any one of the circuits shown in FIGS. 7A to 7D and combining resistors having two different types of first degree and second degree temperature coefficients, it is possible to realize a first degree or second degree temperature-coefficient-generating circuit which is equivalent to the above described circuit. However, a value of device often may be a negative value depending on a temperature coefficient. It may be possible to avoid the device from having a negative value by changing values of k and m by several percent.

Fifth Embodiment.

(Span-Shift-Temperature-Coefficient First Degree Compensating Circuit Including a Combination of Resistors Which Have Two Different Temperature Coefficients)

Figure 8:
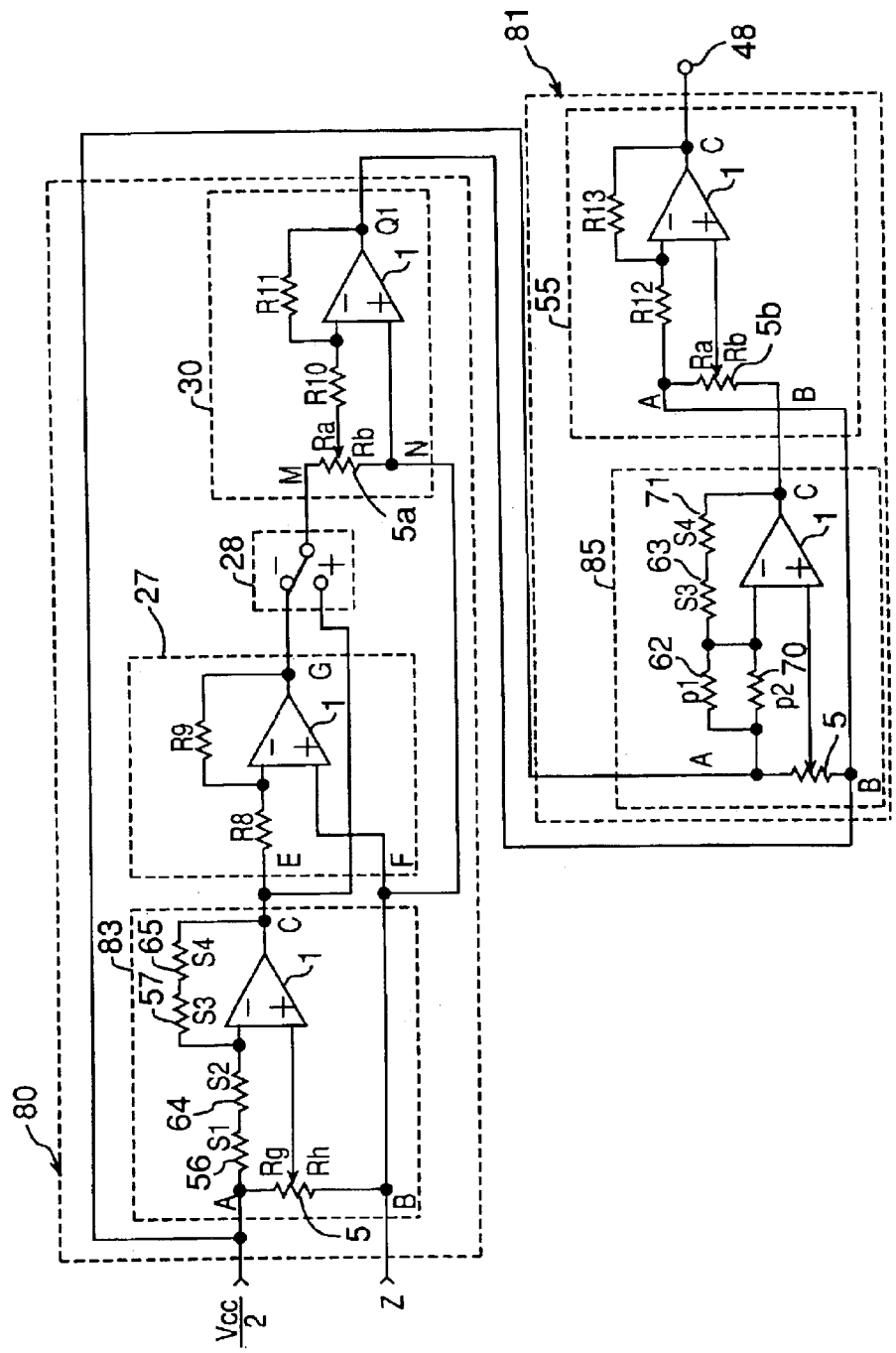
FIG. 8 is an illustration showing circuit diagrams of a span-shift-temperature-coefficient first degree compensating circuit and a span-shift-temperature-coefficient second degree compensating circuit respectively constituted of two resistors each having different temperature coefficient in the fifth embodiment.

FIG. 8 is an illustration showing configurations of a span-shift-temperature-coefficient first degree compensating circuit which is comprised of two types of resistors, and a span-shift-temperature-coefficient second degree compensating circuit. A temperature-coefficient first degree compensating circuit 80 comprises four circuit blocks. The four circuit blocks includes a first degree temperature-coefficient-generating circuit 83 using two types of resistors shown for the previously-described embodiments, a first degree temperature-coefficient-sign-inverting circuit 27 for inverting the sign of a first degree temperature coefficient, a sign-switching circuit 28 for selecting the sign of a first degree temperature coefficient, and a first degree temperature-coefficient-adjusting circuit 30 having a variable resistor 5a for adjusting a first degree temperature coefficient to an optional value. The span-shift-temperature-coefficient second degree compensating circuit 81 comprises two circuit blocks including a span-shift second degree temperature-coefficient-generating circuit 85 and a second degree temperature-coefficient-adjusting circuit 55.

The circuit in FIG. 7A is applied to the first degree temperature-coefficient-generating circuit 83, while the circuit in FIG. 7D is applied to the second degree temperature-coefficient-generating circuit 85. Other circuit blocks are the same as circuit examples shown for the first or second embodiment, and have the same functions.

As a result of calculating a specific resistance value and a relative error corresponding to the expression (149b) by using temperature coefficient of two types of resistors among temperature coefficients of three types of resistors shown by the expression (45), there is no problem. A temperature-compensating circuit is constituted by using the following two types of temperature coefficients.

$$\beta 1=1.5\times 10^{-3}, \beta 2=0.2\times 10^{-6}, \gamma 1=6.3\times 10^{-3}, \gamma 2=14\times 10^{-6} \quad (290)$$

In the first degree temperature-coefficient-generating circuit 83 shown in FIG. 8, values of resistors at t=0 are obtained as described below. In the expressions (230a) to (230d), resistance values of the first degree temperature-coefficient-generating circuit 83 at t=0 are assumed as S5=3 and S6=5. A voltage amplification factor becomes equal to 1+5/3=8/3. By substituting the value shown by the expression (290) for the expression (247), e=0.71354 is obtained. Therefore, at t=0, the resistance value s1 of the resistor 56 becomes e(S5)=2.140, and the resistance value s2 of the resistor 64 becomes (1−e)(S5)=0.8593. Since any value of f which is not equal to e can be used, f is set to 0.2 to obtain s3=f(S6)=1.0 and s4=(1−f)(S6)=4.0.

Moreover, in the second degree temperature-coefficient-generating circuit 85 shown in FIG. 8, values of resistors at t=0 are obtained as described below. In the expressions (230e), (230f), (230c), and (230d), it is assumed that resistance values of the first degree temperature-coefficient-generating circuit 83 at t=0 are P5=3 and S6=5. The voltage amplification factor becomes equal to 1+5/3=8/3. When setting f to 0.6 and k to 1.66666 so as to meet kf=1 in accordance with the expression (282), reference resistance values at L=0 become k(P5)=1.8, p2−k(k−1)(P5)=7.500, s3=t(S6)=3.000, and s4=(1−f)(S6)=2.000. The circuit shown in FIG. 6A is used, and therefore the slider of a variable resistor is adjusted so as to be d=1 as shown by the expression (242b).

The following results are obtained by executing the calculation similarly to the case of the relative error η22s shown by the expression (149) about the circuit shown in FIG. 8 having the above temperature coefficient and resistance values, calculating the relative error η22sp(%) of the circuit, and confirming the validity of the operational circuit blocks 83 and 85. As span-shift temperature coefficients, α=3,000 ppm/° C. (3×10⁻³/° C.) and t=ta−ts (ts=25° C.) are set.

pensating circuit 45 is not restricted to the configuration shown in FIG. 3 but various modifications of the circuit 45 are considered. For example, even if a method of applying the signal voltage and voltage Vcc/2 to the input terminals A and B of the first degree temperature-coefficient-generating circuit 20b at the initial stage are changed, it is possible to obtain an output signal which is equivalent, to that of the first embodiment by converting the signal voltage in rear-stage circuits.

Figure 9:
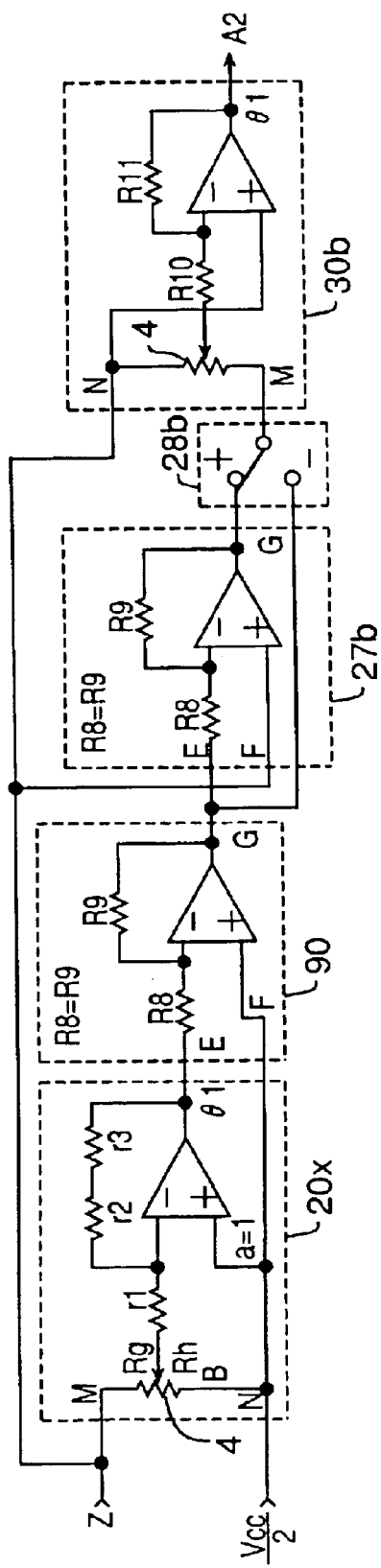
FIG. 9 is a circuit diagram showing a first modification of a span-shift-temperature-coefficient first degree compensating circuit in the sixth embodiment.
Figure 10:
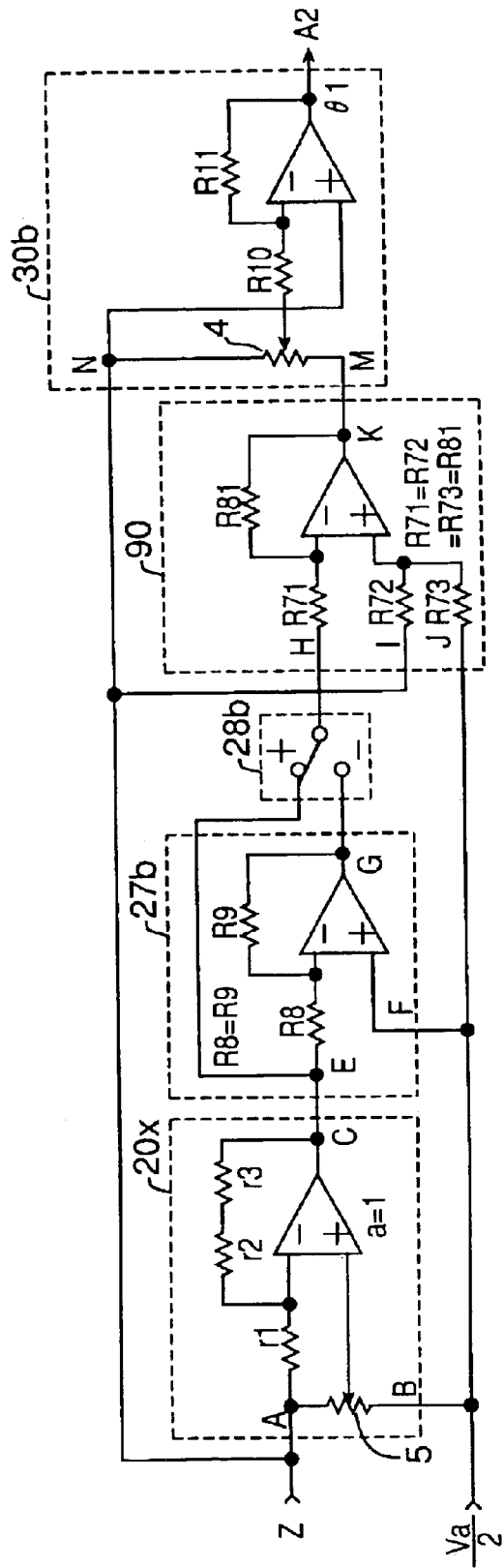
FIG. 10 is a circuit diagram showing a second modification of a span-shift-temperature-coefficient first degree compensating circuit in the sixth embodiment.

FIGS. 9 and 10 show modifications of the circuit 20b. In these modifications, operational circuit blocks 20x, 90, 27b and 30b in four-stages are cascaded, and outputs shown by the expressions (100) and (119) are obtained. Electrical actions in these circuit diagrams can be proved by using the input/output transfer functions shown in FIGS. 13 to 15 in the same manner as the above described. Both of first degree temperature-coefficient-compensating circuits comprise blocks including a first degree temperature-coefficient-generating circuit 20, a first degree temperature-coefficient-sign-inverting circuit 27, a sign-switching circuit 28, and a first degree temperature-coefficient-adjusting circuit 30, which are cascaded in this order A signal-converting circuit 90 for inverting and combining signal voltages is interposed between any two of the above circuit blocks. Thereby, an output signal voltage same as the case of the first embodiment is obtained from the output terminal θ1.

In the case of the above embodiments, voltage amplification factors a, b, d, d2, d3, and d4 of the first degree temperature-coefficient-generating circuit 20b to input voltage are all set to 1. However, it is also permitted to set the factors to 2. In this case, it is permitted to interpose the signal-converting between the circuit blocks at the second or more stages. When the voltage amplification factor of the first degree temperature-coefficient-generating circuit 20 is set to 2, the temperature coefficient of the voltage amplification factor of the first degree temperature-coefficient-generating circuit 20b becomes two times larger than the case with the factor set to 1. Thus, it is possible to lower the

TABLE 4

| t (° C.) | −70 | −50 | −20 | 0 | 20 | 60 | 100 | 110 |
|---|---|---|---|---|---|---|---|---|
| ta (° C.) | −45 | −25 | 0 | 25 | 45 | 85 | 125 | 135 |
| η 21 s (%) | −0.19 | −0.05 | −0.001 | 0 | −0.001 | −0.105 | −0.81 | −1.19 |
| η 22 sp (%) | −0.059 | 0.013 | 0.0034 | 0 | −0.006 | −0.195 | −1.03 | −1.40 |

The above results are the same as the case of η22s(%) calculated in accordance with the expression (149), and shows that there is no problem in the relative error even by combining two types of resistors.

Sixth Embodiment.

(Other Examples: In the Case of Voltage Amplification Factors a=1 and a=2)

Figure 11:
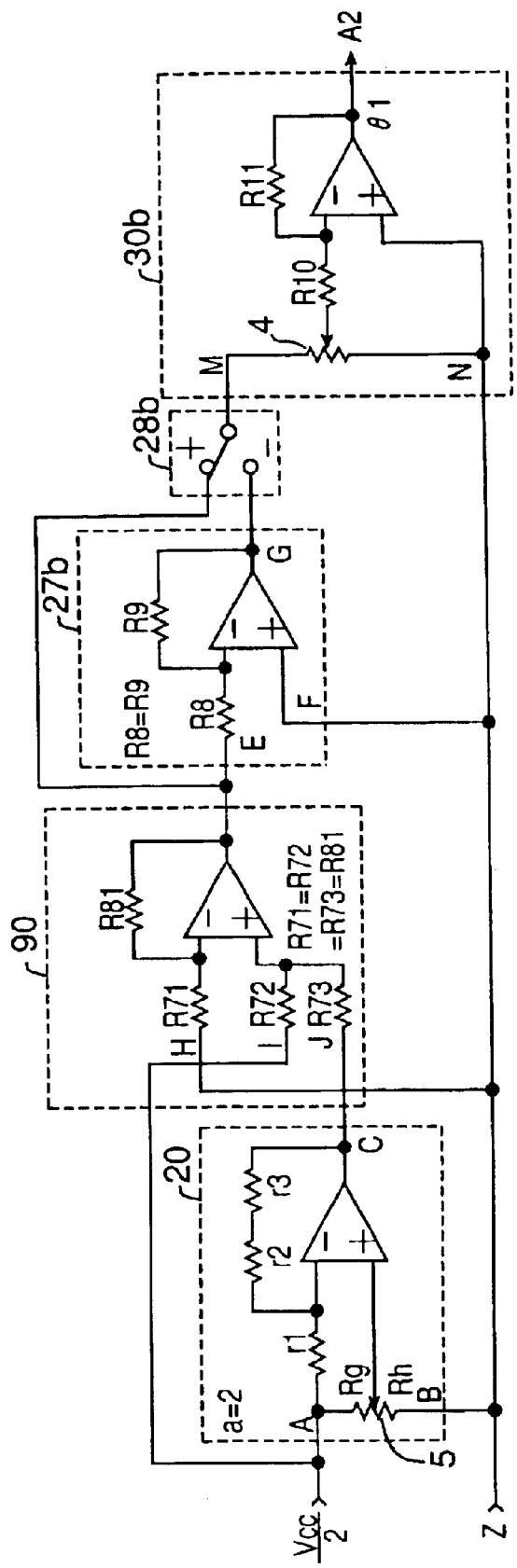
FIG. 11 is a circuit diagram showing a third modification of a span-shift-temperature-coefficient first degree compensating circuit in the sixth embodiment.
Figure 12:
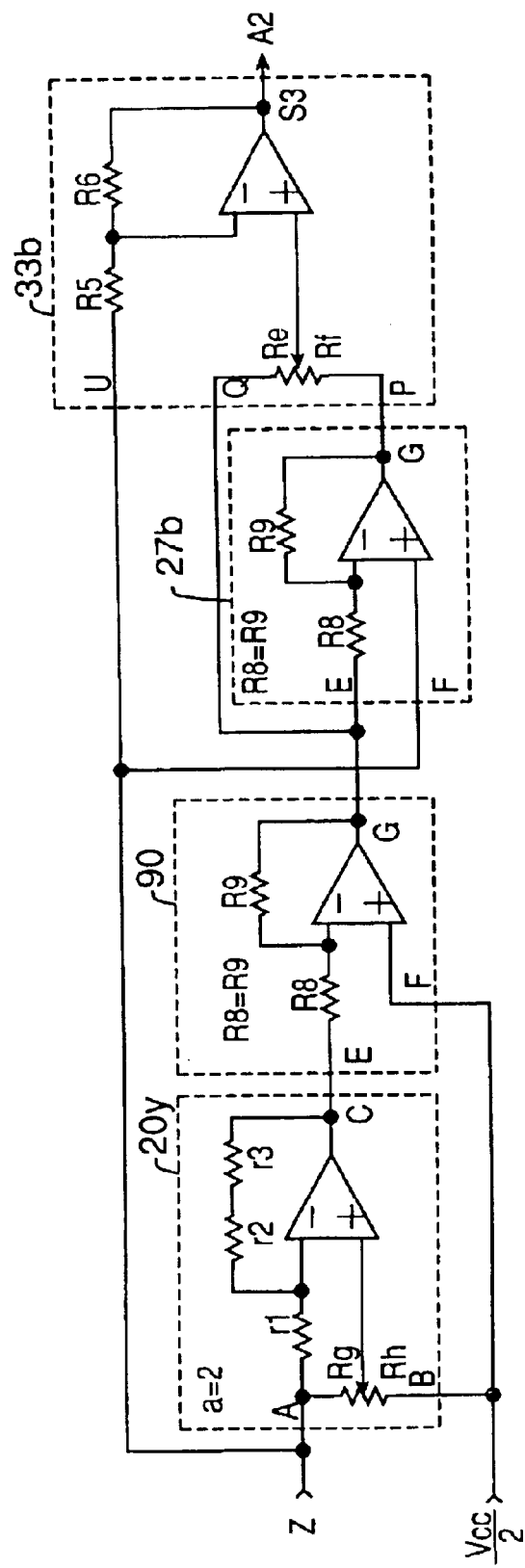
FIG. 12 is a circuit diagram showing a fourth modification of a span-shift-temperature-coefficient first degree compensating circuit in the sixth embodiment.

The above-described span-shift-temperature-coefficient first degree compensating circuit 45 comprises blocks including a first degree temperature-coefficient-generating circuit 20b, a first degree temperature-coefficient-sign-inverting circuit 27b, a sign-switching circuit 28b, and a first degree temperature-coefficient-adjusting circuit 30b (or 33b), which are cascaded in this order. A voltage Vcc/2 and a signal voltage Z including the span-shift temperature coefficient shown by the expression (107) are applied to input terminals A and B of the first degree temperature-coefficient-generating circuit 20b at a first stage. A predetermined signal which is compensated for temperature is output from an output terminal θ1 (or S3). A configuration of the span-shift-temperature-coefficient first degree comvoltage amplification factor of an operational circuit for setting temperature coefficients of the first degree temperature-coefficient-adjusting circuits 30b and 33b at the rear-stage to a predetermined value, and the stability of all circuits can be improved. The circuits shown in FIGS. 11 and 12 are the examples.

Electrical actions of these circuits can be easily explained by using the input/output transfer functions shown in FIGS. 13 to 15. Also in this case, a circuit can be constituted so that an output voltage same as the case of the first embodiment is obtained from the output terminal θ1 or S3 of a first degree temperature-coefficient-compensating circuit.

The above modifications of the span-shift-temperature-coefficient first degree compensating circuit 45 can be also applied to the first degree temperature-coefficient-generating circuit 20 and offset-drift-constant-compensating circuit 10 including the rear-stage circuit blocks 20, 27, 28 and 30 (or 33).

Resistors r1, r2, r3, r5, r6, r7, s1 to s4, and p1 to p4 used for the above first degree temperature-coefficient-generating circuits 20, 20b, 20x, 20y, 60, and 83 and the span-shift first degree and second degree temperature-coefficient-generating circuits 45, 80, 50, 50h and 85 are shown by expressions having first degree and second degree temperature coefficients about temperature t. However, a change of resistance values to temperature may be more accurately expressed by using third or higher degree temperature coefficients about t in addition to first and second degree temperature coefficients depending on a condition in a semiconductor-integrated circuit. That is, for example, a case in which a resistance value is shown by the following expression.

$$r=R\{1+(\alpha 1)t+(\alpha 2)t^2+(\alpha 3)t^3\}, \quad t=ta-ts$$

Even when showing a resistance value by the above expression, first degree and second degree temperature-coefficient-generating circuits can be realized through a calculation process completely same as the above though the calculation formula becomes complex. Therefore, it is not necessary to restrict expressions showing resistance values to first degree and second degree temperature-coefficient expressions.

Each of temperature-compensating circuits of the present invention described above measures an ambient temperature under the same environment as a pressure sensor, executes operations, extremely reduces influences of a span-shift temperature coefficient α, an offset drift constant β included in a pressure-detection output voltage supplied from a pressure sensor shown by the expression (1), and obtains, at the output terminal of the temperature-compensating circuit, a detected voltage corresponding to the expression (2) in which the influence to temperature is canceled.

Moreover, in the temperature-compensating circuit of the present invention, a temperature-compensating method uses analog-voltage processing, and thereby the chip size of a semiconductor-integrated circuit can be reduced compared to the case of a digital processing method. Therefore the fabrication cost can be reduced.

Furthermore, a temperature-compensating circuit of the present invention uses resistors with two or three types cc resistances having different temperature coefficients for a temperature sensor. Therefore the circuit can be applied to a semiconductor analog integrated circuit such as a CMOS or bipolar circuit.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. A first degree temperature-coefficient-generating circuit comprising an amplifying circuit that includes:
   a) an operational amplifier having first and second input terminals and an output terminal;
   b) a feedback resistor circuit having at least one resistor and coupling said output terminal of the operational amplifier to said first input terminal of the operational amplifier;
   c) an input resistor circuit having at least one resistor and being directly connected to said first input terminal of the operational amplifier; and
   an adjusting circuit coupled to the second input terminal and configured to adjust a voltage amplification factor of the amplifying circuit at a reference temperature, wherein:
   at least one of the feedback resistor circuit and the input resistor circuit includes a plurality of resistors having different value temperature coefficients, and
   a resistance value of each resistor of the feedback resistor and the input resistor circuits is decided so that the voltage amplification factor of the amplifying circuit changes linearly with a first degree temperature coefficient.

2. The first degree temperature-coefficient-generating circuit according to claim 1, wherein:
   resistors of the feedback resistor and input resistor circuits include resistors of only two different temperature coefficient characteristics.

3. The first degree temperature-coefficient-generating circuit according to claim 1, wherein:
   resistors of the feedback resistor and input resistor circuit include resistors of three different temperature coefficient characteristics.

4. A second degree temperature-coefficient-generating circuit comprising an amplifying circuit that includes:
   a) an operational amplifier having first and second input terminals and an output terminal;
   b) a feedback resistor circuit having at least one resistor and coupling said output terminal of the operational amplifier to said first input terminal of the operational amplifier;
   c) an input resistor circuit having at least one resistor being directly connected to said first input terminal of the operational amplifier; and
   an adjusting circuit coupled to the second input terminal configured to adjust the voltage amplification factor of the amplifying circuit at a reference temperature wherein:
   at least one of the feedback resistor circuit and the input resistor circuit includes a plurality of resistors having different value temperature coefficients,
   the at least one resistor of the feedback resistor circuit and the at least one resistor of the input resistor circuit have mutually different value temperature coefficients, and
   a resistance value of each resistor of the feedback resistor and input resistor circuits is decided so that the voltage amplification factor of the amplifying circuit chances quadratically with a second degree temperature coefficient.

5. The second degree temperature-coefficient-generating circuit according to claim 4, wherein:
   resistors of the feedback resistor and input resistor circuits include resistors of only two different temperature coefficient characteristics.

6. The second degree temperature-coefficient-generating circuit according to claim 4, wherein:
   resistors of the feedback resistor and input resistor circuit include resistors of three different temperature coefficient characteristics.

7. An offset-drift-constant temperature-compensating circuit comprising:
   a) a first degree temperature-coefficient-generating circuit including amplifying circuit that includes:
   1) an operational amplifier; and
   2) a plurality of resistors of types defined by mutually different temperature coefficients;
   wherein a resistance value of each resistor is decided so that a voltage amplification factor of the amplifying circuit changes linearly with a first degree temperature coefficient;
   b) a sign-inverting circuit for receiving a signal voltage from the first degree temperature-coefficient-generating circuit and for generating a voltage obtained by inverting the sign of the first degree temperature coefficient in the received signal voltage;

c) a sign-switching circuit for selecting an output supplied from either of the first degree temperature-coefficient-generating circuit and the sign-inverting circuit; and d) a first degree temperature-coefficient-adjusting circuit for receiving a signal voltage from the sign-switching circuit and for generating a voltage obtained by adjusting a first degree temperature-coefficient component to a predetermined value in the received signal voltage;

wherein a voltage obtained by dividing a power-supply voltage is applied as an input voltage of the first degree temperature-coefficient-generating circuit, and an output voltage to be linearly changed in accordance with an ambient-temperature change is generated at an output end of the first degree temperature-coefficient-adjusting circuit.

8. A span-shift temperature-coefficient first degree compensating circuit comprising:

a) a first degree temperature-coefficient-generating circuit including amplifying circuit that includes:
   1) an operational amplifier; and
   2) a plurality of resistors of types defined by mutually different temperature coefficients;
   wherein a resistance value of each resistor is decided so that a voltage amplification factor of the amplifying circuit changes linearly with a first degree temperature coefficient; and
   wherein the voltage amplification factor is set to either of 1 and 2 at a reference temperature;

b) a sign-inverting circuit for receiving a signal voltage from the first degree temperature-coefficient-generating circuit and for generating a voltage obtained by inverting the sign of the first degree temperature coefficient in the received signal voltage;

c) a sign-switching circuit for selecting an output supplied from either of the first degree temperature-coefficient-generating circuit and the sign-inverting circuit; and d) a first degree temperature-coefficient-adjusting circuit for receiving a signal voltage from the sign-switching circuit and for outputting a voltage obtained by adjusting the first degree temperature coefficient to a predetermined value in the received signal voltage;

wherein a voltage including a first degree temperature coefficient component is used as an input signal of an operational amplifier of a first degree temperature-coefficient-generating circuit, and wherein a signal voltage is generated at an output end of the first degree temperature-coefficient-adjusting circuit, which cancels the first degree temperature coefficient component of the input signal and includes a second degree temperature coefficient component.

9. A span-shift temperature-coefficient second degree compensating circuit comprising:

a) a second degree temperature-coefficient-generating circuit including an amplifying circuit that includes:
   1) an operational amplifier; and
   2) a plurality of resistors of types defined by mutually different temperature coefficients;
   wherein a resistance value of each resistor is decided so that a voltage amplification factor of the amplifying circuit changes quadratically with a second degree temperature coefficient; and
   wherein the voltage amplification factor is set to 1 at a reference temperature; and b) a second degree temperature-coefficient-adjusting circuit for receiving a signal voltage from the second degree temperature-coefficient-generating circuit and for outputting a voltage obtained by adjusting the second degree temperature coefficient to a predetermined value in the received signal voltage;

wherein the operational amplifier of the second degree temperature-coefficient-generating circuit receives a signal voltage including a second degree temperature coefficient component from a span-shift temperature-coefficient first degree compensating circuit, and wherein an output voltage is generated in which:
   1) a second degree temperature coefficient component in a fluctuation component of the output voltage is canceled, and
   2) a quaternary temperature coefficient component at the output of the second degree temperature-coefficient-adjusting circuit is included in the output voltage.

* * * * *